(12) United States Patent
Wang et al.

(10) Patent No.: US 11,474,207 B2
(45) Date of Patent: *Oct. 18, 2022

(54) LIDAR SYSTEM AND METHOD

(71) Applicant: Hesai Technology Co., Ltd., Shanghai (CN)

(72) Inventors: Rui Wang, Shanghai (CN); Xuezhou Zhu, Shanghai (CN); Na Li, Shanghai (CN); Jiasheng Li, Shanghai (CN); Hongguang Wang, Shanghai (CN); Shaoqing Xiang, Shanghai (CN); Yifan Li, Shanghai (CN)

(73) Assignee: Hesai Technology Co. Ltd., Shanghai (CN)

( * ) Notice: Subject to any disclaimer, the term of this patent is extended or adjusted under 35 U.S.C. 154(b) by 479 days.

This patent is subject to a terminal disclaimer.

(21) Appl. No.: 16/539,318

(22) Filed: Aug. 13, 2019

(65) Prior Publication Data

US 2019/0369215 A1 Dec. 5, 2019

Related U.S. Application Data

(63) Continuation of application No. 16/123,706, filed on Sep. 6, 2018, now Pat. No. 10,429,495, which is a (Continued)

(30) Foreign Application Priority Data

Apr. 3, 2018 (CN) .................. 201810291177.X

(51) Int. Cl.
*G01S 7/00* (2006.01)
*G01S 7/481* (2006.01)
*G01S 17/42* (2006.01)

(52) U.S. Cl.
CPC .......... *G01S 7/4815* (2013.01); *G01S 7/4817* (2013.01); *G01S 7/4818* (2013.01); *G01S 17/42* (2013.01)

(58) Field of Classification Search
USPC ........................................ 356/5.01
See application file for complete search history.

(56) References Cited

U.S. PATENT DOCUMENTS 4,470,698 A * 9/1984 Green, Jr. ................ G01D 5/36
250/203.1
4,858,244 A * 8/1989 Nordhaus .............. G08B 7/062
372/6

(Continued)

FOREIGN PATENT DOCUMENTS

CN 106093911 A 11/2016
CN 106154281 A 11/2016

(Continued)

OTHER PUBLICATIONS

U.S. Appl. No. 16/386,823 Office Action dated Aug. 19, 2020.
(Continued)

*Primary Examiner* — James R Hulka
(74) *Attorney, Agent, or Firm* — Wilson Sonsini Goodrich & Rosati

(57) ABSTRACT

A Lidar system is provided. The Lidar system comprises: a set of light sources configured to emit a plurality of light beams; a set of optical fiber elements, wherein each of the set of light sources is optically coupled to a first end of one or more optical fiber elements from the set of optical fiber elements; and at least one mounting unit comprising a structure configured to receive a second end of the set of optical fiber elements at one or more directions thereby affecting a direction of the plurality of light beams individually.

20 Claims, 25 Drawing Sheets

Related U.S. Application Data continuation-in-part of application No. PCT/CN2018/086768, filed on May 14, 2018.

(56) References Cited

U.S. PATENT DOCUMENTS

| | | | |
|---|---|---|---|
| 5,291,261 A | 3/1994 | Dahl et al. | |
| 5,953,110 A | 9/1999 | Burns | |
| 7,575,190 B2 | 8/2009 | Sallee | |
| 7,978,312 B2 | 7/2011 | Scott et al. | |
| 8,400,348 B1* | 3/2013 | Guice | G01S 13/88 |
| | | | 235/404 |
| 8,767,190 B2 | 7/2014 | Hall | |
| 9,063,549 B1 | 6/2015 | Pennecot et al. | |
| 9,069,061 B1 | 6/2015 | Harwit | |
| 9,074,878 B2 | 7/2015 | Steffey et al. | |
| 9,295,245 B1* | 3/2016 | Guice | A01M 1/026 |
| 9,383,753 B1 | 7/2016 | Templeton et al. | |
| 9,772,399 B2 | 9/2017 | Schwarz et al. | |
| 9,983,590 B2 | 5/2018 | Templeton et al. | |
| 10,003,168 B1 | 6/2018 | Villeneuve | |
| 10,222,474 B1* | 3/2019 | Raring | F21K 9/64 |
| 10,295,656 B1 | 5/2019 | Li | |
| 10,429,495 B1 | 10/2019 | Wang et al. | |
| 11,199,628 B2* | 12/2021 | Raring | H01S 5/02469 |
| 2003/0043363 A1 | 3/2003 | Jamieson et al. | |
| 2004/0011546 A1* | 1/2004 | Kim | H02G 3/0437 |
| | | | 174/50 |
| 2008/0074640 A1 | 3/2008 | Walsh et al. | |
| 2008/0204707 A1* | 8/2008 | Hwang | G01B 11/18 |
| | | | 356/35.5 |
| 2010/0296077 A1 | 11/2010 | Scott et al. | |
| 2011/0216304 A1 | 9/2011 | Hall | |
| 2013/0101262 A1* | 4/2013 | Wei | G02B 6/4442 |
| | | | 385/135 |
| 2013/0266326 A1 | 10/2013 | Joseph et al. | |
| 2015/0036105 A1 | 2/2015 | Ide et al. | |
| 2015/0185313 A1 | 7/2015 | Zhu | |
| 2016/0124150 A1* | 5/2016 | James | G02B 6/3616 |
| | | | 264/1.27 |
| 2016/0178736 A1 | 6/2016 | Chung | |
| 2016/0306032 A1 | 10/2016 | Schwarz et al. | |
| 2017/0153319 A1 | 6/2017 | Villeneuve et al. | |
| 2017/0155225 A1 | 6/2017 | Villeneuve et al. | |
| 2018/0003805 A1 | 1/2018 | Popovich et al. | |
| 2018/0164408 A1 | 6/2018 | Hall et al. | |
| 2018/0275251 A1 | 9/2018 | Choi et al. | |
| 2019/0302235 A1* | 10/2019 | Wang | G01S 7/4815 |

FOREIGN PATENT DOCUMENTS

| | | |
|---|---|---|
| CN | 106371085 A | 2/2017 |
| CN | 106443634 A | 2/2017 |
| CN | 106908911 A | 6/2017 |
| CN | 107153194 A | 9/2017 |
| CN | 107271983 A | 10/2017 |
| CN | 107688186 A | 2/2018 |
| CN | 206975215 U | 2/2018 |
| CN | 108061904 A | 5/2018 |
| CN | 108508431 A | 9/2018 |
| WO | WO-2019192055 | 10/2019 |
| WO | WO-2019237581 | 12/2019 |

OTHER PUBLICATIONS

Co-pending U.S. Appl. No. 16/386,823, filed Apr. 17, 2019.
PCT/CN2018/086768 International Search Report and Written Opinion dated Jan. 2, 2019.
PCT/CN2018/108409 International Search Report and Written Opinion dated Mar. 13, 2019.
U.S. Appl. No. 16/123,706 Notice of Allowance dated Jul. 10, 2019.
U.S. Appl. No. 16/123,706 Office Action dated Apr. 25, 2019.
U.S. Appl. No. 16/170,783 Notice of Allowance dated Mar. 7, 2019.
U.S. Appl. No. 16/170,783 Office Action dated Jan. 25, 2019.

* cited by examiner

LIDAR SYSTEM AND METHOD

CROSS-REFERENCE

This application is a continuation application of U.S. application Ser. No. 16/123,706, filed Sep. 6, 2018, which is a continuation application of International PCT Application No. PCT/CN2018/086768, filed May 14, 2018, which claims priority to Chinese Application No. 201810291177.X, filed Apr. 3, 2018, each of which is entirely incorporated herein by reference.

BACKGROUND OF THE INVENTION

Lidar technology can be used to obtain three-dimensional information of an environment by measuring distances to objects. A Lidar system may include at least a light source configured to emit a pulse of light and a detector configured to receive returned pulse of light. The returned pulse of light or light beam may be referred to as echo light beam. Based on the lapse time between the emission of the pulse of light and detection of returned pulse of light (i.e., time of flight), a distance can be obtained. The pulse of light can be generated by a laser emitter then focused through a lens or lens assembly. The returned pulse of light may be received by a detector located near the laser emitter. In some Lidar systems, such a pair of laser emitter and detector may be configured to rotate about a rotational axis thus scanning across a plane.

In some situations, in order to obtain sufficient three-dimensional information, multiple emitter/detector pairs may be employed. Such Lidar may also be referred to as multiline Lidar. A multiline Lidar may provide benefits of achieving a large field of view or greater resolution. A large area scan can be achieved by rotating Lidar and thereby rotating the vertical field of view with the Lidar. In some cases, the multiple emitter/detector pairs may be arranged into arrays. The number and/or distribution of emitters arranged in a vertical direction (e.g., with respect to ground level) may substantially affect the angular resolution or angle range in the vertical field of view. For example, the vertical angular resolutions of 16-line, 32-line, and 64-line Lidars are 2°, 1.33°, and 0.43° respectively. In another example, the vertical angular resolutions of 4-line and 8-line Lidars are each 0.8°. The angular resolution or angle range may be limited by the spatial configuration of the emitters. For instance, as more laser lines are needed to achieve a higher vertical resolution, the overall Lidar system may have to increase the size to accommodate more laser emitters. In some cases, a crowded or dense arrangement of the lasers may prevent excess heat generated by the lasers from being removed or dissipated from the Lidar system resulting in poor reliability of the Lidar system.

SUMMARY OF THE INVENTION

A need exists for improved Lidar system for three-dimensional measurement. A further need exists for a multiline Lidar with improved spatial resolution or greater field of view without increasing the size of the overall system. The provided Lidar system may address the above needs by providing a flexible and spatially configurable emitting device of the Lidar system. The provided Lidar system may be configured to allow for three-dimensional imaging with improved accuracy and better performance. In particular, the cost of the provided Lidar system may be lowered by providing an emitting apparatus that may be easy to assemble. Additionally, the provided Lidar may exhibit improved performance and better device reliability with improved heat dissipation capability.

In some aspects, a Lidar system is provided. The Lidar system comprises: a set of light sources configured to emit a plurality of light beams; a set of optical fiber elements, wherein each of the set of light sources may be optically coupled to a first end of one or more optical fiber elements from the set of optical fiber elements; and at least one mounting unit comprising a structure configured to receive a second end of one or more optical fiber elements from the set of optical fiber elements at one or more directions thereby affecting a direction of each of the plurality of light beams individually. In some embodiments, the set of light sources, the set of optical fiber elements and the at least one mounting unit are configured to rotate about a vertical axis. For example, the set of light sources, the set of optical fiber elements or the at least one mounting unit may be disposed on a supporting body connected to a rotor of the LiDAR system. In some embodiments, the at least one mounting unit may be configured to rotate about a vertical axis. In some cases, the set of light sources may be disposed on a stator of the Lidar system and the at least one mounting unit may be disposed on a rotor of the LiDAR system, and wherein the set of light sources and the at least one mounting unit are rotatably coupled via the set of optical fiber elements.

In some embodiments, each of the set of light sources may be optically coupled to one or more optical fiber elements using an optical coupling element. In some embodiments, at least one of the set of light sources may be optically coupled to two or more optical fiber elements using an optical coupling element. In some cases, a fraction of light coupled to one of the two or more optical fiber elements may be different from a fraction of light coupled to another one of the two or more optical fiber elements. In some cases, the two or more optical fiber elements have different optical properties.

In some cases, the structure comprises a set of slots arranged in a vertical direction and a horizontal direction. In some embodiments, the structure comprises a set of slots arranged along a horizontal direction. In some cases, the set of slots have a cross-section in a shape selected from a group consisting of a V shape, D shape, W shape and C shape. In some cases, at least one of the set of slots has a tilt angle such that the second end of optical fiber element received in the at least one slot may be angled along a horizontal direction. In some cases, a subset of the set of the slots has a tilt angle different from a tilt angle of another subset of the set of the slots. In some cases, the number of the set of slots is greater than the number of the set of optical fiber elements. In some examples, the second ends of the set of optical fiber elements are non-uniformly arranged along the vertical direction by selecting a subset of slots from the set of slots. In some cases, the set of slots are non-uniformly spaced along the vertical direction.

In some embodiments, the second end of the set of optical fiber elements has an angled light emitting surface to affect a direction of the corresponding light beams. In some embodiments, the plurality of light beams emitted from the second ends of the set of optical fiber elements are directed to an optical element to collimate the plurality of light beams into collimated light beams to propagate in different directions. In some embodiments, the Lidar system further compses a receiving device to receive echo light beams and wherein the receiving device may be disposed on a rotor of the Lidar system. In some embodiments, the Lidar system further comprises a second mounting unit stacked to the at least one mounting unit along a vertical direction. In some embodiments, the set of light sources are located in close proximity to at least one heat sink to facilitate heat dissipation.

In another aspect, a Lidar system comprising an emitting appratus and a receiving appratus is provided. In practice, the Lidar system comprises: an emitting apparatus comprising a set of light sources configured to emit a plurality of light beams, a set of optical fiber elements optically coupled to the set of light sources, and at least one mounting unit, wherein the at least one mounting unit may be configured to position a light emitting end of the optical fiber elements into an angle thereby affecting a direction of each of the plurality of light beams individually; and a receiving apparatus configured to receive echo light beams to detect a target, wherein the echo light beams are a portion of the light beams reflected by the target.

In some embodiments, the at least one mounting unit and the receiving apparatus are configured to rotate about a vertical axis. In some embodiments, the at least one mounting unit and the receiving apparatus are disposed on a supporting body connected to a rotor of the LiDAR system. In some embodiments, each of the set of light sources may be optically coupled to one or more optical fiber elements with aid of an optical coupling element. In some embodiments, at least one of the set of light sources may be optically coupled to two or more optical fiber elements with aid of an optical coupling element. In some embodiments, the at least one mounting unit comprises a set of slots arranged along a vertical direction to receive the light emitting ends of the set of optical fiber elements at one or more directions. In some cases, at least one of the set of slots has a tilt angle such that the axial direction at the light emitting end of an optical fiber element received in the at least one slot may be along the 146. In some embodiments, the emitting apparatus may be located in close proximity to at least one heat sink.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure may be capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
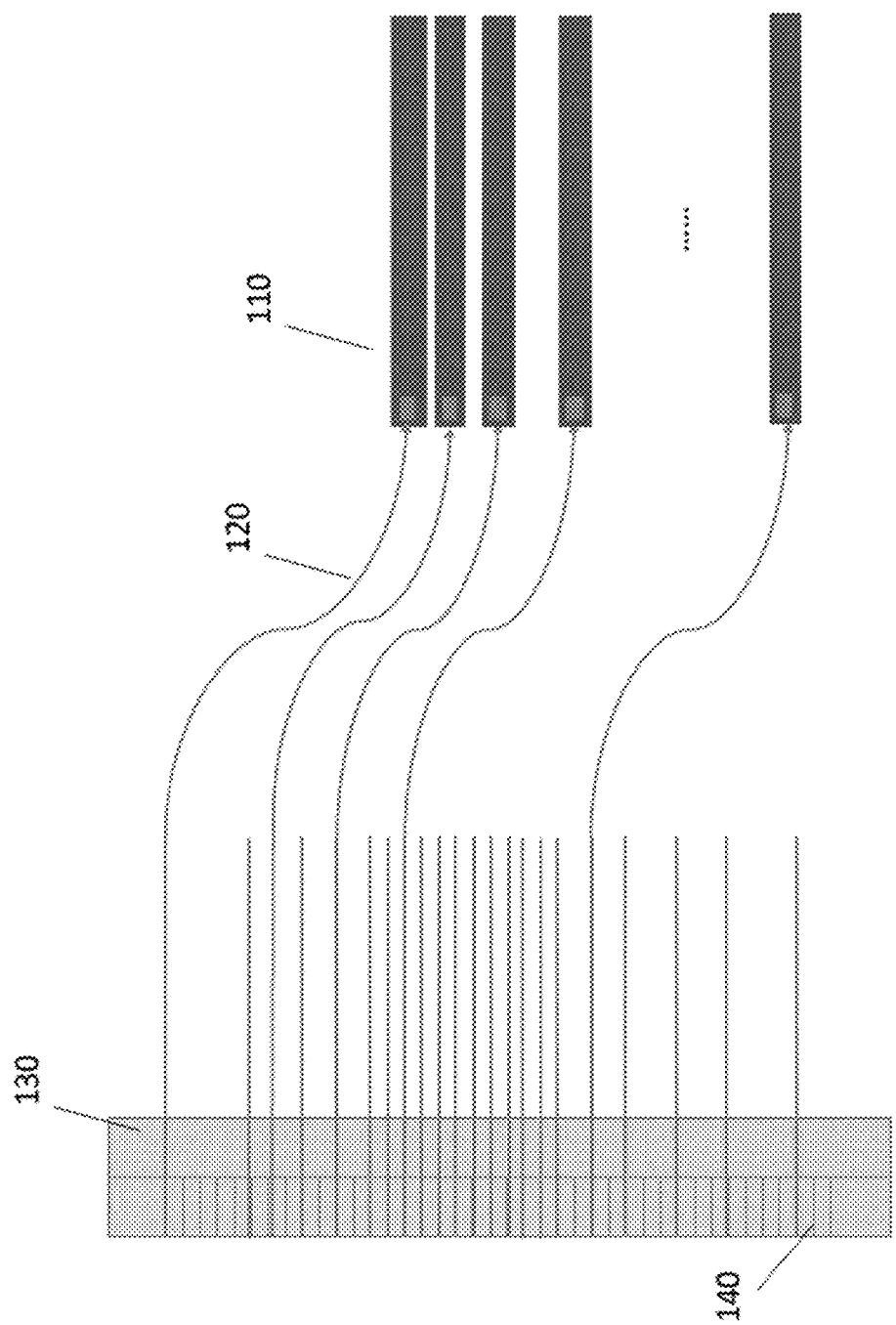
FIG. 1 schematically shows a mounting unit for arranging a plurality of optical fiber elements into pre-determined directions, with some embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Lidar is a type of ranging sensor characterized by long detection distance, high resolution, and low interference by the environment. Lidar has been widely applied in the fields of intelligent robots, unmanned aerial vehicles, autonomous driving or self-driving. The working principle of Lidar is estimating a distance based on a round trip time of electromagnetic waves between a source and a target.

Multiline Lidar has been increasingly used in research and commercial applications. In a multiline Lidar system, a plurality of lasers and corresponding detectors are arranged in a vertical direction to increase the detection range in the vertical direction. In a conventional multiline Lidar system, spatial configuration or arrangement of the laser emitters may significantly restrict the resolution or field of view. The provided Lidar systems and methods may resolve the space restriction by employing optical fibers and a mounting structure for controlling the direction of light beams in a flexible and/or configurable manner.

In some embodiments, when a Lidar system is not rotating, the emitting apparatus of the Lidar system may emit laser beams which project into the environment to scan a line (e.g., a vertical line scan). Along this line scan, in some instances, a plurality of laser beam spots may be non-uniformly distributed (e.g., preferred to be denser in the middle of the line scan). The spacing between the laser beams spots along the line scan may determine the angular resolution of the Lidar. When the Lidar system rotates, the line scan may turn into a surface scan as a vertical area is scanned by the laser beams. In some cases, the angular range of the line scan or of the surface scan in the vertical plane may determine the vertical field-of-view of the Lidar system, and the angular range of the surface scan in the horizontal plane may determine the horizontal field-of-view of the Lidar system. Correspondingly, the distribution of light beams along the vertical line may determine the resolution of the Lidar system in the vertical field-of-view, and the rotation speed of the Lidar may determine the resolution of the Lidar system in the horizontal field-of-view.

In some embodiments, Lidar system of the present disclosure may comprise at least an emitting apparatus and a receiving apparatus. In some embodiments, the emitting apparatus may comprise a set of light sources configured to emit a plurality of light beams, a set of optical fiber elements optically coupled to the set of light sources at an input end, and coupled to a mounting unit at an output end. The mounting unit may be configured to position a light emitting end of the optical fiber elements into an angle thereby affecting a direction of the plurality of light beams. As utilized herein, terms "light emitting end", "output end" or "emission end" and the like are used interchangeably throughout the specification unless context suggests otherwise. The terms can refer to the end of the optical fiber where light is emitted out. The terms "light input end" and "input end" are used interchangeably throughout the specification unless context suggests otherwise.

FIG. 1 schematically shows a mounting unit 130 for arranging a plurality of optical fiber elements 120 into pre-determined directions, with some embodiments of the invention. In some embodiments, a set of optical fiber elements 120 may be optically coupled to a set of light sources 110 at one end (e.g., light input end). A plurality of light beams may be emitted out of the set of optical fiber elements from a light emission end or output end. The directions of the plurality of output light beams may be controlled or determined by the mounting unit 130. The mounting unit 130 may comprise a directional structure 140 connected to the light emission end of the optical fiber elements 120 such that the directions or distributions of the output light beams can be configured by the mounting unit.

In preferred embodiments, the directional structure 140 may comprise a set of slots configured for receiving the light emission ends of the set of optical fiber elements. The set of slots may be designed to have pre-determined directions and distributions thereby controlling the directions and/or distributions of light beams output from the light emission end of the optical fiber elements. In some cases, the plurality of slots may be arranged into an array along the length of the mounting unit. In some cases, the plurality of slots may have a longitudinal direction which may be orientated at various angles with respect to the length of the mounting unit such that the direction of light beams can be controlled individually. The output end of an optical fiber element may be guided by a corresponding slot thereby affecting a direction of the output light beam.

An optical fiber element may be fixedly connected to a slot selected from the plurality of slots. In some instances, the optical fiber element may be rigidly affixed to the mounting unit at the light emission end such that the light emission end of the optical fiber element may be not permitted to move relative to the mounting unit. In some instances, the optical fiber element may be rotatably fixed by the mounting unit at the light emission end such that the light emission end of the optical fiber element may be allowed to rotate about a fiber axis at the output end which may be guided by the corresponding slot.

An optical fiber may be an optical-waveguide device which can be any device that provides a constrained guided optical path in a solid, for example, an optical fiber having one or more waveguide cores or an optical slab or monolithic substrate having a width and length each larger than the thickness, and having one or more waveguides formed therein (e.g., laterally spaced waveguides formed by diffusion of an index-modifying material through a mask to form surface or near-surface waveguides). An optical fiber can be any device having one or more cores or internal waveguides and a length much longer than a transverse width, for example a glass fiber drawn from a melt or preform or extruded from an extruder. A thin optical fiber may be a fiber that is thin enough to be readily bent to some non-infinite radius (e.g., a conventional optical fiber). An optical ribbon is defined as a fiber having two or more signal cores laterally spaced across a width of the fiber. In some cases, an optical fiber element is selected to be deformable or flexible such that the spatial configuration of the plurality of light sources is decoupled or dissociated from the spatial configuration of the set of slots or the emission end. For instance, the optical fiber elements may be bendable such that the plurality of light sources may be located at any suitable location in the Lidar system with respect to the mounting unit or the emission end. As utilized herein, the terms "optical fiber" and "optical fiber element" are interchangeable throughout this specification unless context suggests otherwise.

In some embodiments, the directional structure 140 may comprise a set of optical waveguides configured for receiving the light emission ends of the set of optical fiber elements. The optical waveguides may be in any suitable form factor such as planar waveguide, a rectangular waveguide (e.g., strip waveguide), a rib waveguide, a segmented waveguide or photonic crystal waveguide, a laser-inscribed waveguide or various others. In some instances, the optical waveguides may be a substantially rigid structure so as to maintain optical alignment of the plurality of light beams. For instance, the light emission ends of the set of optical fiber elements may be optically coupled with the input ends of the set of optical waveguides of the directional structure 140. The set of optical waveguides may be designed to have pre-determined directions and distributions thereby controlling the directions and/or distributions of light beams output from the light emission end of the optical fiber elements. In some cases, the plurality of optical waveguides may be arranged into an array along the length of the mounting unit. In some cases, the plurality of optical waveguides may tilt with various angles along the length of the mounting unit such that the direction of light beams can be controlled individually. The output end of an optical fiber element may be guided by a corresponding optical waveguide thereby affecting a direction of the output light beam.

The directional structure 140 may be integrally formed with the mounting unit. For instance, the directional structure 140 may be grooves, channels, slots or the like fabricated (e.g., etched, molded, cut, engraved, etc) with the mounting unit. Additionally or alternatively, the directional structure or at least a portion of the directional structure is a separate component and is assembled to mounting unit. Any suitable fabrication or machining methods can be used to form the directional structure.

The plurality of optical fiber elements can be any suitable type of fiber such as, single-mode (SM) fiber, multi-mode (MM) fiber, large-mode-area (LMA) fiber, polarization-maintaining (PM) fiber, photonic-crystal or photonic-bandgap fiber, gain fiber (e.g., rare-earth-doped optical fiber for use in an optical amplifier), or any suitable combination thereof. In some cases, the plurality of optical fiber elements may be the same type of optical fiber such as a multi-mode fiber. Light beams output from the plurality of optical fiber elements may be the same in terms of beam quality, power, wavelength, and various other aspects. Alternatively, light beams output from the plurality of optical fiber elements may be different. For example, the optical coupling element for coupling light generated by the light source (e.g., laser) into the optical fibers may be used to control various properties of the light beams. Details about the coupling element are discussed later herein.

In some cases, the plurality of optical fiber elements may be selected to have different properties or parameters such as numerical aperture (NA), coupling capability, end surface and various others. Different properties or parameters of the optical fiber elements may be selected to affect one or more beam parameters (e.g., beam size, divergence, focusing, or numerical aperture (NA)).

In some cases, different optical fibers may be selected according to a scanning region or field of view. For example, in the vertical direction of an environment surrounding an automobile application, the emitted light beams may be desired to be dense in the middle region and sparse in the upper and lower regions. Light beams emitted by the lasers may pass through one or more optical components such as optical collimation devices respectively and then irradiate on an external object, for example, a ground, a pedestrian, a bicycle, a bus stop board, or an automobile. As the Lidar rotates (rotate back and forth about one or more axes within an angular range or revolute about an axis), the vertical line of non-uniformly distributed beams may scan a vertical area ahead, where the middle region of the vertical area may have denser light beams for detection and thus has increased detection accuracy. Since the remote object is usually at the same horizontal level as the Lidar, the external object may be more likely to be detected by light beams in the middle region, and may require more accurate detection and longer distance range. In this case, optical fiber elements corresponding to the light beams emitted into the middle region (i.e., long distance range) may have a higher NA for higher light beam power, so as to detect a longer distance range. In some cases, the optical fiber elements corresponding to the light beams emitted into the lower region such as directed to the ground (i.e., short distance range) may have a lower NA for lower light beam power. In some cases, the NA of the optical fiber elements may be in a range determined by the core diameter of the optical fiber which can be, for example, from 100 micron to 200 micron.

In some cases, the plurality of optical fiber elements may have different output end surfaces. The output end surface of the optical fiber elements may affect the direction of an output light beam. In some cases, an angle of the end surface with respect to the fiber axis at the output end may affect the direction of output light beam. In this case, the direction of output light beam may be controlled by alternating the angle of the end surface, the configuration of the slots or a combination of both.

Figure 2:
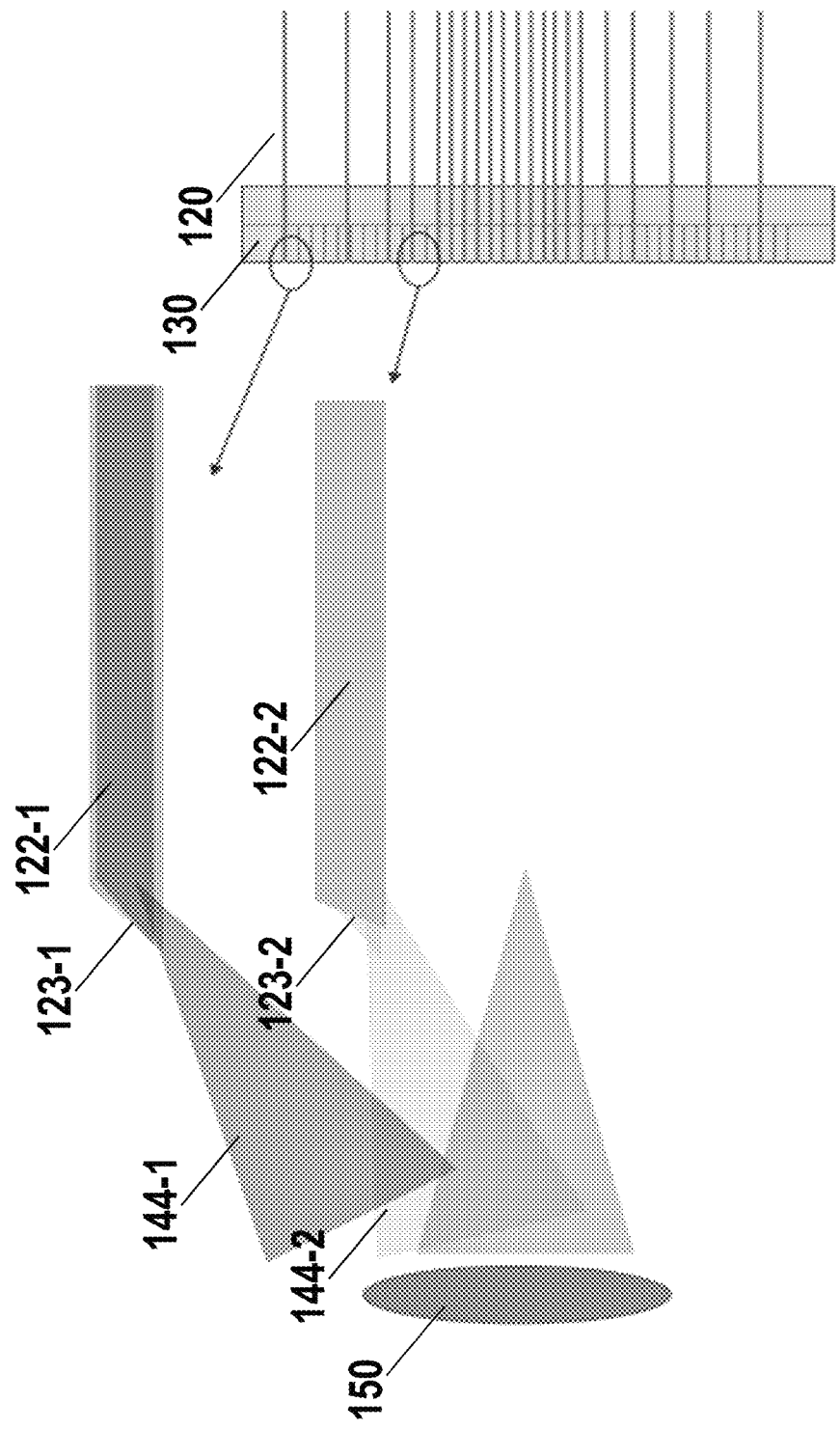
FIG. 2 illustrates a plurality of optical fibers having different end surfaces thereby affecting directions of output light beams.

FIG. 2 schematically illustrates a plurality of optical fibers 120 having different end surfaces 123-1, 123-2 thereby affecting directions of the output light beams 144-1, 144-2. As aforementioned, an output end 122-1, 122-2 of the plurality of optical fiber elements 120 may be received by the mounting unit 130 by a directional structure. In some cases, the end surface of the output end may be angled with respect to the fiber axis to affect the direction of output light beams. In some cases, the output light beams may be directed to one or more optical element 150 such as a lens or lens assembly (e.g., one or more spherical lenses, cylindrical lenses, or aspheric lenses) for collimating or focusing light beams. The one or more lenses or one or more mirrors may be used to expand, focus, or collimate the output light beams to a desired beam diameter or divergence. In some cases, the directions of output light beams may be controlled such that the output light beams may incident on the lens at an optimal angle for a better convergence, collimation or expansion result. It should be noted that although a plurality of output light beams 144 are shown in the example, such light beams may not be emitted concurrently. For instance, the plurality of output beams may be emitted sequentially controlled by a controller of the Lidar system.

Figure 3:
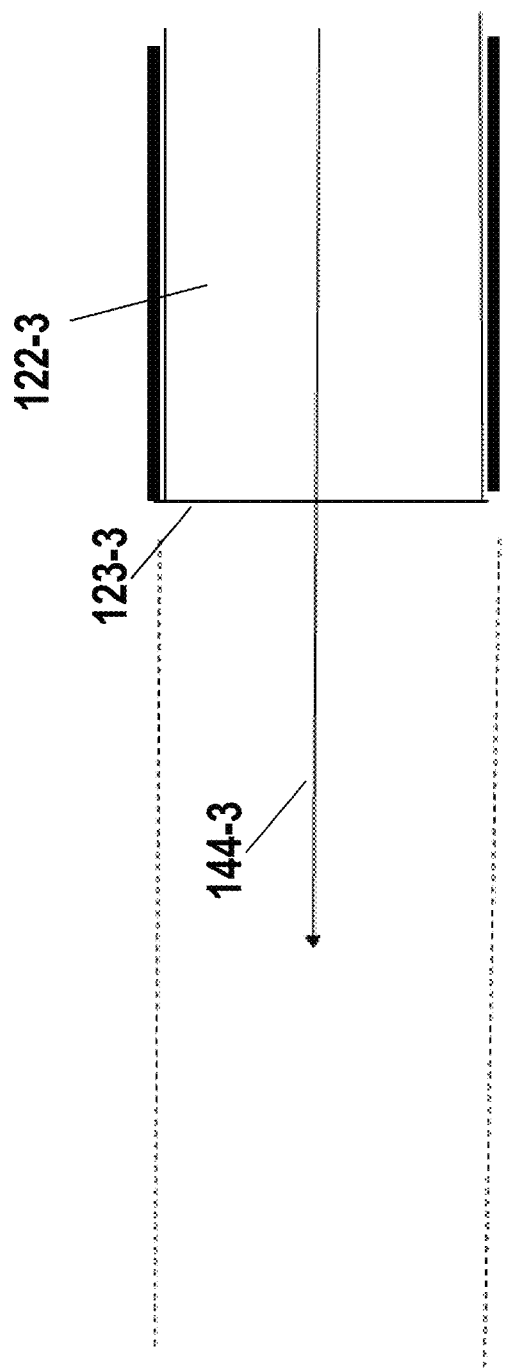
FIG. 3 shows an example of an optical fiber having a perpendicular end surface at the output end.

In some embodiments, the end surface at the output end may be perpendicular to the fiber axis such that the direction of output light beams may be controlled by the direction of the corresponding slot receiving the optical fiber. FIG. 3 shows an example of an optical fiber having a perpendicular end surface 123-3 at the output end 122-3. The output light beam may be substantially perpendicular to the end surface thus the direction of output light beams may be controlled by controlling the direction of the fiber axis 124 at the output end. The output end of the optical fiber may conform to the direction of the slot or guided by slot such that the direction of the output light beams can be controlled by the slots or the mounting unit. This may provide benefit to allow for a simple assembly process since the optical fiber can be attached to the mounting unit regardless the orientation of the end surface. Additionally, cost on fabricating the optical fibers may also be lowered.

Figure 4:
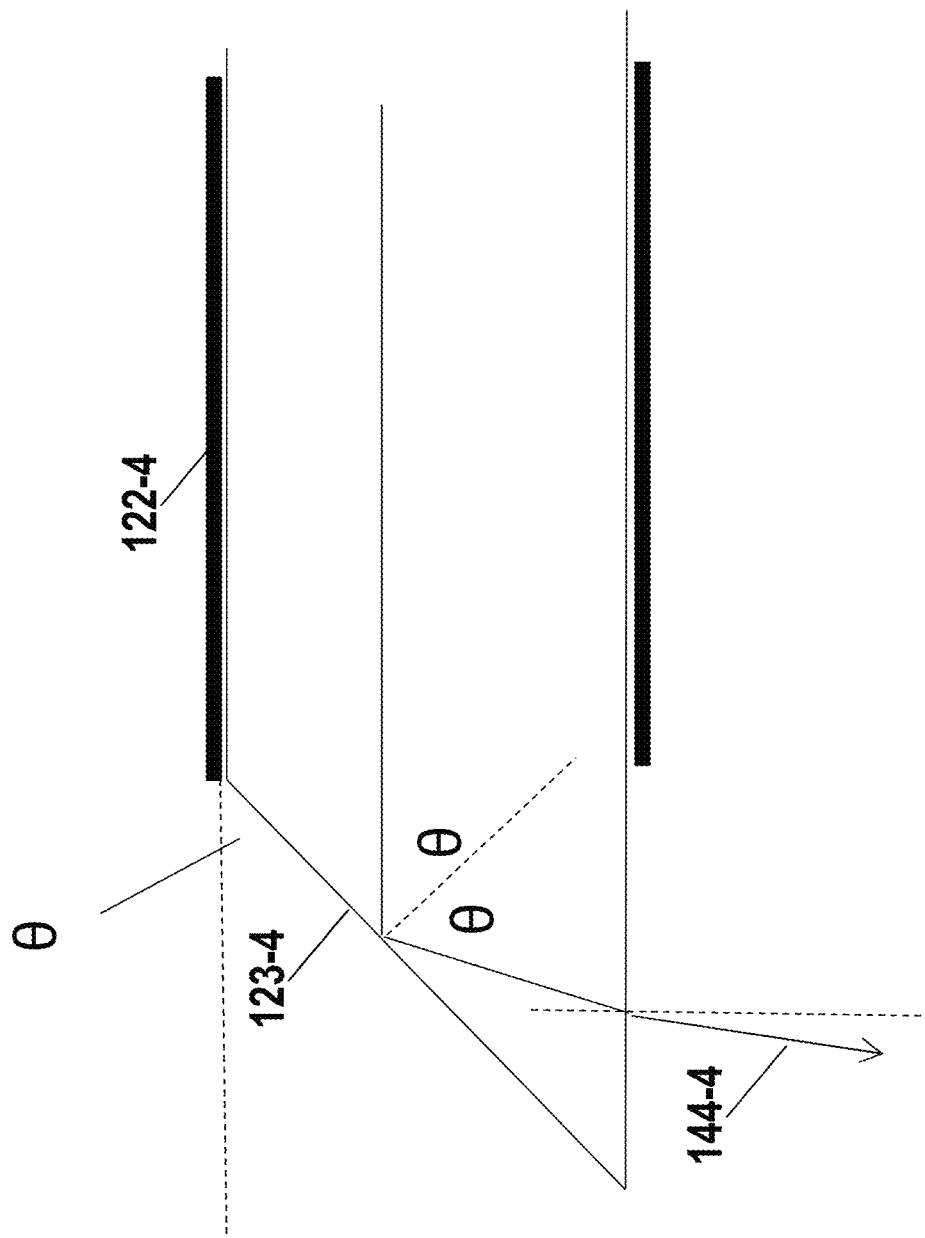
FIG. 4 shows an example of an optical fiber with an angled end surface.

In some embodiments, the end surface may be angled with respect to the fiber axis at the output end to direct the output light into a desired or pre-determined direction. FIG. 4 shows an example of an optical fiber with an angled end surface 123-4. In the illustrated example, the end surface 123-4 may have an angle not perpendicular to the fiber axis at the output end, such that the output light beam 144-4 may be directed into a pre-determined direction such as towards the lens or a scanning device. In some cases, the angle may be selected such that a total internal reflection may happen at the end surface the light beam can be redirected by a greater degree. The angle may be designed according to below equation:

$$C = \arcsin\frac{n_2}{n_1}$$

where n2 represents the refractive index of air, n1 represents the refractive index of the optical fiber, and C represents the critical angle. ϴ represents the incident angle of the incident light beam to the angled end surface 123-4, 90-ϴ represents the optical fiber cutting angle. When the angle ϴ is greater than C, a light beam incident on the end surface within certain angle range may be redirected to a greater degree away from the fiber axis.

Figure 5:
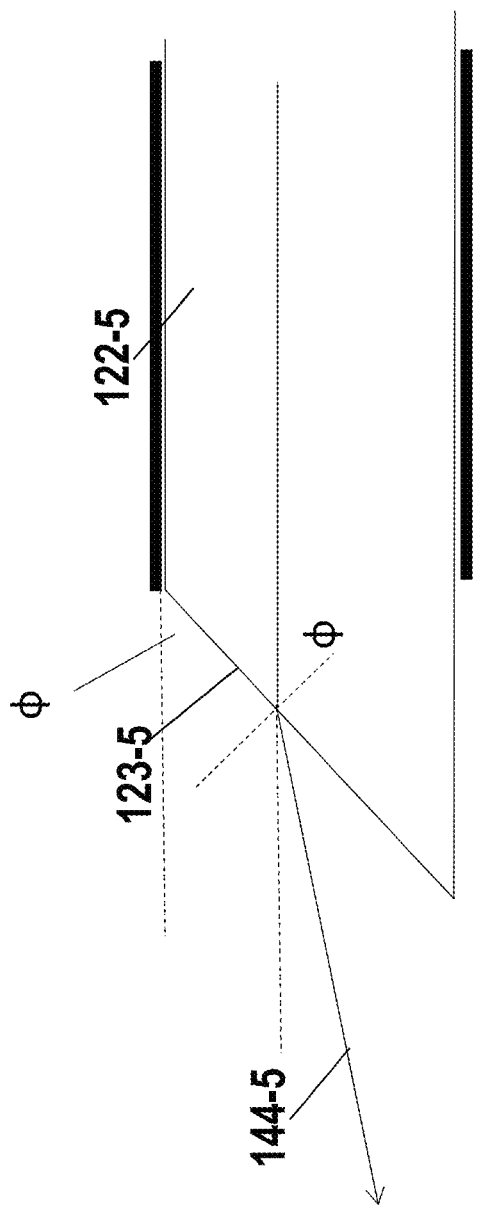
FIG. 5 shows another example of end surface and the light path effected thereby.

FIG. 5 shows another example of end surface 123-5 and the effected light path. Φ represents the incident angle of the incident light beam to the angled end surface 123-5, 90-Φ represents the optical fiber cutting angle. As shown in the example, the end surface 123-5 may have an angle Φ smaller than the critical angle as described above. In such case, the output light beam 144-5 is refracted at the end surface and directed by an angle different from the angle in FIG. 4.

Figure 6:
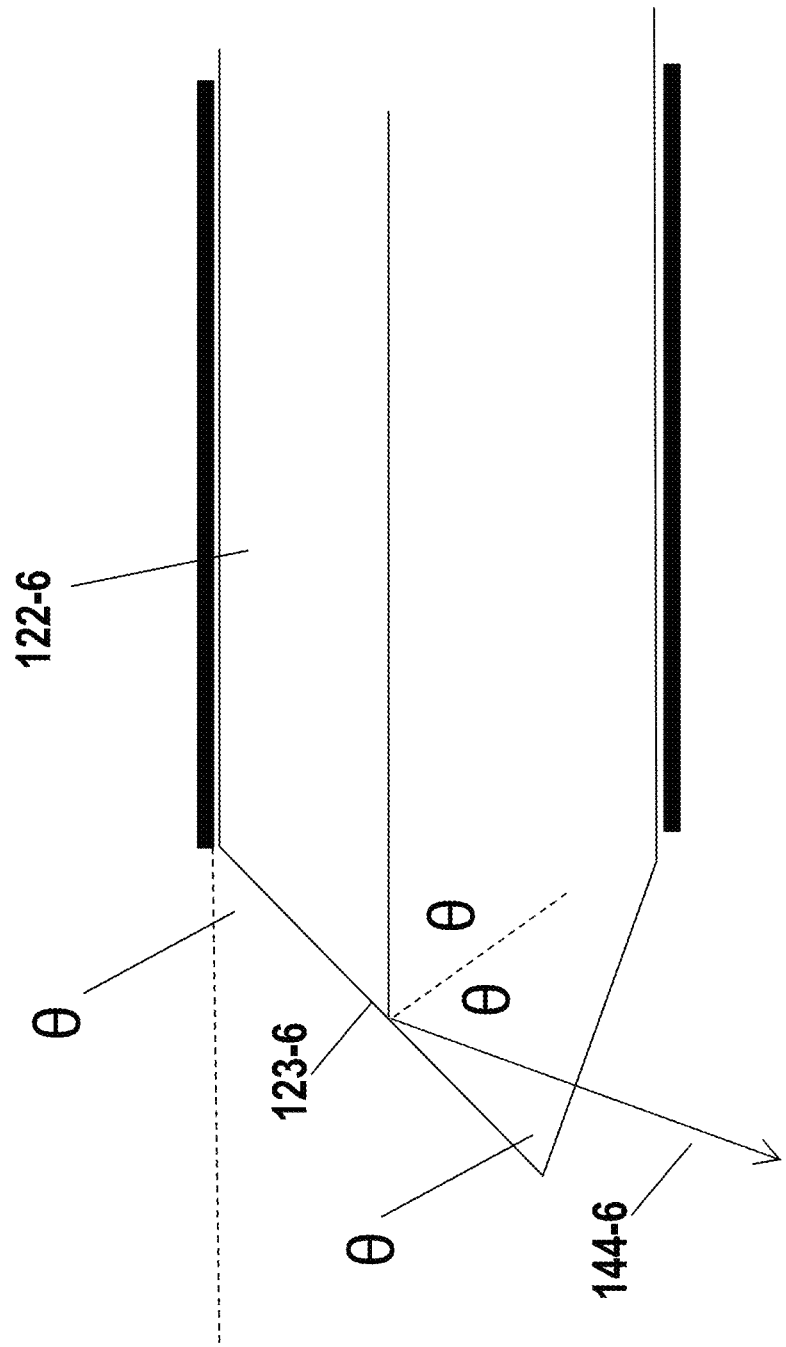
FIG. 6 shows an example of a multi-facet end surface.

The end surface may have any shape or surface profile. For example, the end surface may comprise one or more facets. The end surface may be formed by one or more cuts. The end surface may comprise a substantially planar surface or a non-planar surface. In some cases, the profile of the end surface may be designed to affect the direction of output light beams. FIG. 6 shows an example of multi-facet end surface 123-6. As illustrated in the example, the light beam may incident on one facet and be directed out of the optical fiber from another facet of the end surface 123-6 at the output end 122-6. The output light beam 144-6 may exit the end surface at an angle different from the angles in the examples described in FIG. 4 or FIG. 5. In some instances, by redirecting the light beams based on total internal reflections or refraction at the end surface, a need for certain optical component (e.g., collimator, reflector) may be eliminated. This may advantageously provide a compact design of the Lidar system to reach a smaller size or lower the cost by reducing optical components of the system.

In some embodiments, one slot may be configured to receive one optical fiber element. The total number of slots may be greater than or equal to the total number of optical fiber elements. Alternatively, the total number of slots may be less than the total number of optical fiber elements. In some cases, it is preferable to provide more slots than the optical fiber elements such that a subset of slots may be selected from the plurality of slots to achieve variable beam distributions. For instance, based on specific applications, the region in the field of view where denser light beams distributions is desired may be different. The light beam distribution and/or directions may be controlled by selecting varied subset of slots from the plurality of slots. Different subsets of slots may have different controlled directions and densities. This provides benefit to allow for a Lidar system with flexibility and configurability to accommodate different and complex angular resolution requirement or range of angle. In some instances, in a sparse region, fewer slots may be selected for connecting optical fiber elements thereby improving energy efficiency or lowering energy consumption of the Lidar system. In some instances, based on different requirements for range of angle, slots with greater degree of angle with respect to a horizontal direction (e.g., slots located away from the centerline or middle region) may be selected to achieve a wider vertical field of view.

Figure 7:
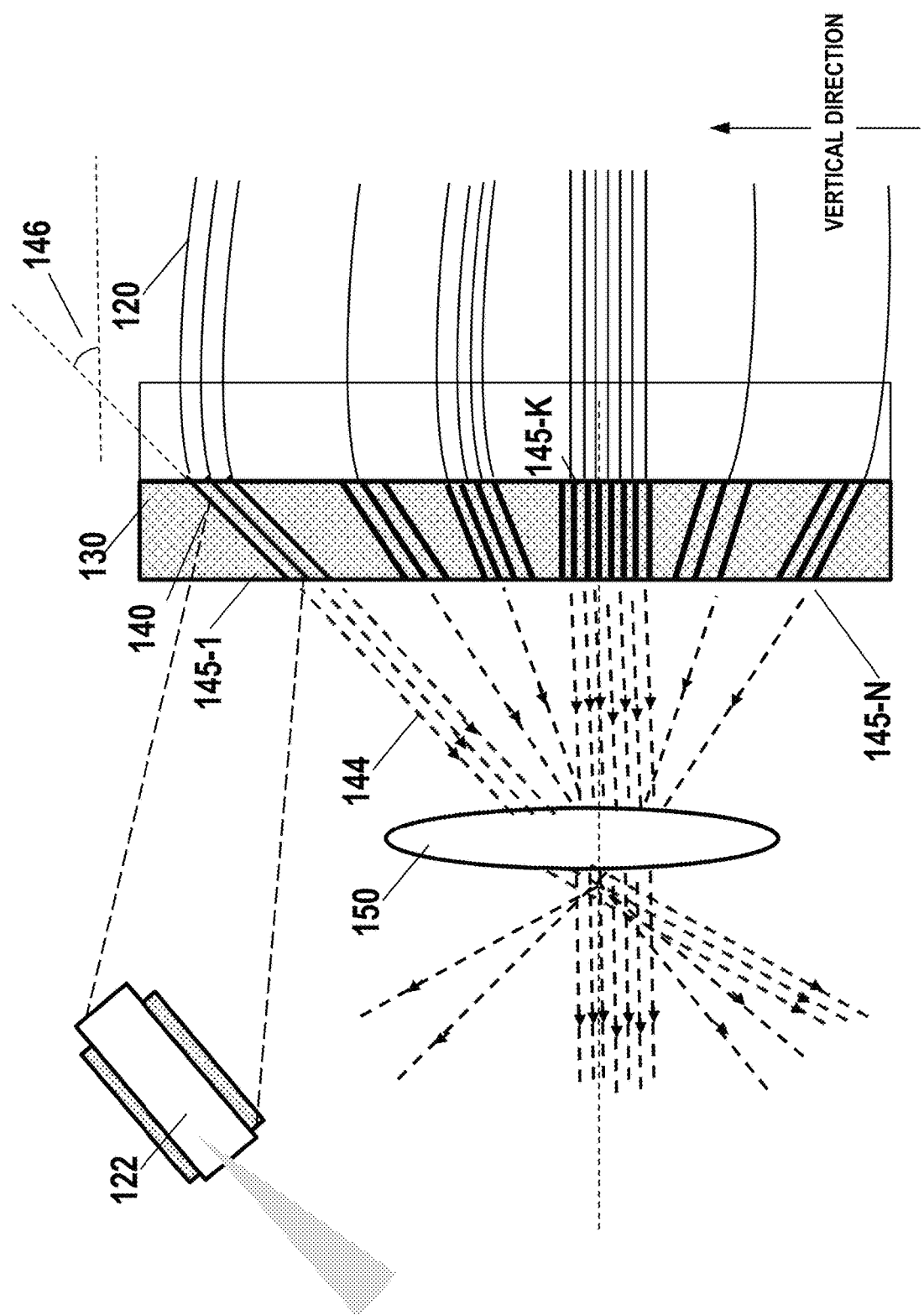
FIG. 7 schematically illustrates a mounting unit for configuring a plurality of light beams, in accordance with embodiments.

FIG. 7 schematically illustrates a mounting unit 130 for configuring a plurality of light beams 144, in accordance with embodiments. The mounting unit 130 may comprise a directional structure for controlling the directions of the output end 122 of the plurality of optical fiber elements 120. The directional structure may include a plurality of slots 141. The plurality of optical fiber elements can be the same as the optical fiber elements as described above. A plurality of output light beams 144 may be directed to pre-determined directions controlled by the mounting unit. In some embodiments, the plurality of output light beams 144 may pass through one or more optical elements such as a lens or lens assembly (e.g., one or more spherical lenses or aspheric lenses) 150 for collimation, divergence, expansion, convergence or various other effects.

The output end of the plurality of optical fiber elements may or may not be configured to alternate a light path of the light beam. In some cases, the end surface of the output end 122 may be substantially perpendicular to the fiber axis such that a direction of output light beam may be controlled by the mounting unit. Additionally or alternatively, the end surface of the output end may be designed to have a pre-determined angle non-perpendicular to the fiber axis such that light beam may be refracted or reflected by the end surface thereby further changing the direction of the output light beam. In some embodiments, the plurality of optical fiber elements may all have a planar surface perpendicular to the fiber axis. This may ease the assembly process since the optical fiber can be attached to the mounting unit regardless of the orientation of the end surface. In some embodiments, at least some of the optical fiber elements may have an angled end surface (i.e., non-perpendicular to the fiber axis). For instance, optical fibers received by or connected to the top or bottom slots may have angled end surface to further direct the output light beam to a greater degree of angle thereby expanding the vertical field of view.

In some embodiments, the plurality of slots 141 may be arranged along a length direction of the mounting unit 130. In some cases, when the mounting unit is positioned such that length direction of the mounting unit is parallel to a vertical direction, at least a subset of the slots may correspond to lines of a Lidar system. The plurality of slots 141 may be arranged into an array. The array may be a one-dimensional array or two-dimensional array. In some embodiments, the array of slots may be formed on one side of the mounting unit. The array of slots may or may not have the output ends aligned along the vertical direction. The array of slots may or may not have the same length. Details about the slot dimension and geometrics are discussed later herein.

In some embodiments, the plurality of slots may be grouped into a plurality of groups 145-1, . . . 145-$k$, . . .

145-N. Each group may comprise a subset of consecutive slots. In some cases, the subset of slots within a group may be parallel with each other. Alternatively, the subset of slots within a group may not be in parallel with each other. The subset of slots within a group may or may not be evenly spaced. The plurality of groups may or may not be evenly spaced or uniformly distributed or the spacing between adjacent groups may or may not be constant. The plurality of slots can be grouped into any number of groups such as at least 1, 2, 3, 4, 5, 6, 7, 8, 9, 10, 15 or more groups.

The number of slots in each group may or may not be the same. For instance, there may be more slots in the group 145-K which may be close to the middle portion, than the slots in the upper group 145-1 or lower group 145-N. Each group may comprise any number of slots. For example, at least 1, 2, 3, 4, 5, 6, 7, 8, 9, 10, 15, 20, 25, 30 or more slots may be grouped into a group. The spacing between adjacent slots across different groups may or may not be the same. For instance, spacing in the group close to the middle portion may be smaller than the spacing in the upper group 145-1 or lower group 145-N.

In some embodiments, slots in different groups may have different angles with respect to the length direction of the mounting unit. For example, as shown in FIG. 7, the uppermost group 145-1 may have an angle 146 greater than the angle of the middle group 145-K. The angle with respect to a fiber axis at the output end can be in any suitable range, such as, in any range from −60° to 60°, or in any other range. The difference in angles of adjacent groups may be, for example, no more than 0.1°, 0.2°, 0.3°, 0.4°, 0.5°, 0.6°, 0.7°, 0.8°, 0.9°, 1°, 2°, 5°, 10°, 15° or any number greater than 15°. In some instances, the degree of angle may increase from the middle group (e.g., 145-K) to and off-center group (e.g., group 145-1 or 145-N). In some instances, the incremental step of angles from a middle group (e.g., 145-K) to an off-center group (e.g., group 145-1 or 145-N) may not be constant number. The incremental step can be, for example, no more than 0.1°, 0.2°, 0.3°, 0.4°, 0.5°, 0.6°, 0.7°, 0.8°, 0.9°, 1°, 2°, 5°, 10°, 15° or any number greater than 15°. The angles of slots/groups can be precisely controlled such that the directions of output light beams can be controlled with improved precision and accuracy. The angle with respect to the fiber axis with respect to the length direction of the mounting unit may also be referred to as a tile angle throughout the specification. In some cases, the tilt angle can also be defined with respect to the width direction or the mounting unit (e.g., horizontal direction).

The distribution of the plurality of groups or the distribution of slots within each group need not be symmetrical about the centerline or middle line of the mounting unit. In some cases, the distribution of the slots and the angles of the slots may be determined according to a desired vertical angular resolution, range of the vertical field of view, desired angular resolution in a given region and various others. Additionally or alternatively, the density of slots within each group may be substantially the same across different groups whereas the angular resolution or distribution of light beams may be controlled by selecting more or less slots from each group. The spacing (e.g., center to center) between adjacent slots may be at least 1, 1.1, 1.2, 1.3, 1.4, 1.5, 1.6, 1.7, 1.8, 1.9, 2 times or more of the width of the slot. In some cases, the spacing between adjacent slots may be dependent on the dimension of the optical fibers such that two adjacent optical fibers may be spaced apart by no more than 0.05 mm, 0.1 mm, 0.2 mm, 0.3 mm, 0.4 mm, 0.5 mm, 0.6 mm, 0.7 mm, 0.8 mm, 0.9 mm, 1 mm, 2 mm or any number greater than 2 mm. The compact arrangement of slots may allow for more light beams fit within an area or region thereby improving the resolution without increasing the overall size of the Lidar system.

For example, in the vertical direction, the lasers and corresponding laser beams or laser lines may be distributed densely in the middle part of the device, and may be distributed sparsely in the upper and lower parts. In another example, a 40-line in-vehicle Lidar may have a vertical field of view range of −25° to +15° corresponding to a span of the emitted beams from the vertically lowest laser to the highest laser, with the horizontal level being 0°. In the vertical field of view range of −6° to +2°, the Lidar may have a vertical angular resolution of ⅓° corresponding to a first concentration of laser beams. In the vertical field of view range of +2° to +3°, −14° to −6°, the Lidar may have a vertical angular resolution of 1° corresponding to a second concentration of laser beams. In the vertical field of view range of +3° to +5°, the Lidar may have a vertical angular resolution of 2° corresponding to a third concentration of laser beams. In the vertical field of view range of +5° to +11°, the Lidar may have a vertical angular resolution of 3° corresponding to a fourth concentration of laser beams. In the vertical field of view range of +11° to +15°, the Lidar may have a vertical angular resolution of 4° corresponding to a fifth concentration of laser beams. In the vertical field of view range of −19° to −14°, the Lidar may have a vertical angular resolution of 5° corresponding to a sixth concentration of laser beams. In the vertical field of view range of −25° to −19°, the Lidar may have a vertical angular resolution of 6° corresponding to a seventh concentration of laser beams. Accordingly, the slots located in the middle group may be denser than the slots located at the top or bottom of the mounting unit. Alternatively or additionally, denser light beams in the middle region may be achieved by selecting more slots located in the middle group to be coupled to optical fibers.

Figure 8:
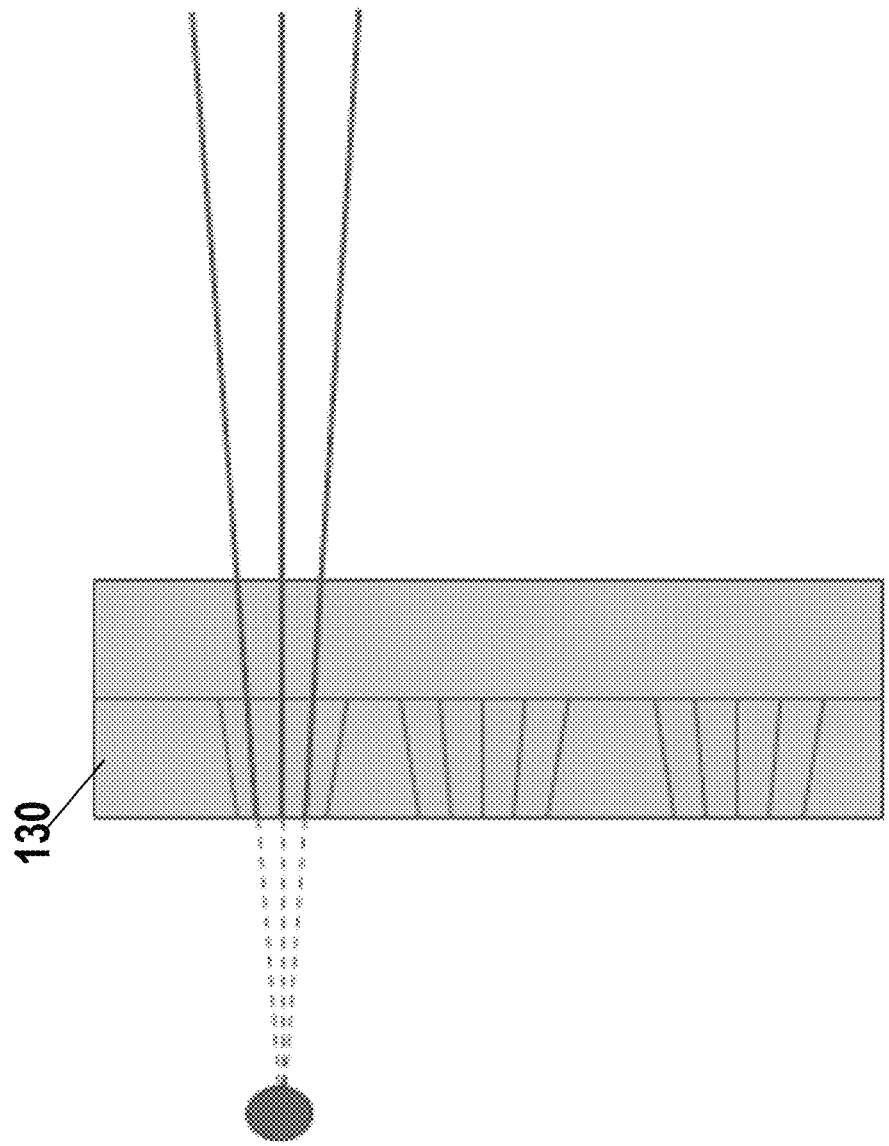
FIG. 8 shows an example of fine controlling the light beam distribution or output directions with aid of a mounting unit.

The aforementioned mounting unit may allow for controlling the light beam distribution in a flexible or configurable manner. In some cases, the light beams may be controlled by the mounting unit to achieve an effect that would otherwise be achieved by an optical element. For instance, light beams may be controlled to be focused on a desired plane or collimated by the mounting unit. In such cases, the optical element (e.g., collimator) used in a conventional Lidar system may be eliminated. FIG. 8 shows an example of fine controlling the light beam distribution or output directions with aid of a mounting unit 130. In the illustrated example, the subset of slots within a group may not be parallel with each other. Other variations may be provided to achieve various effects so as to improve the performance of the Lidar system or remove the necessity of certain optical components utilized in a conventional Lidar system.

Figure 9:
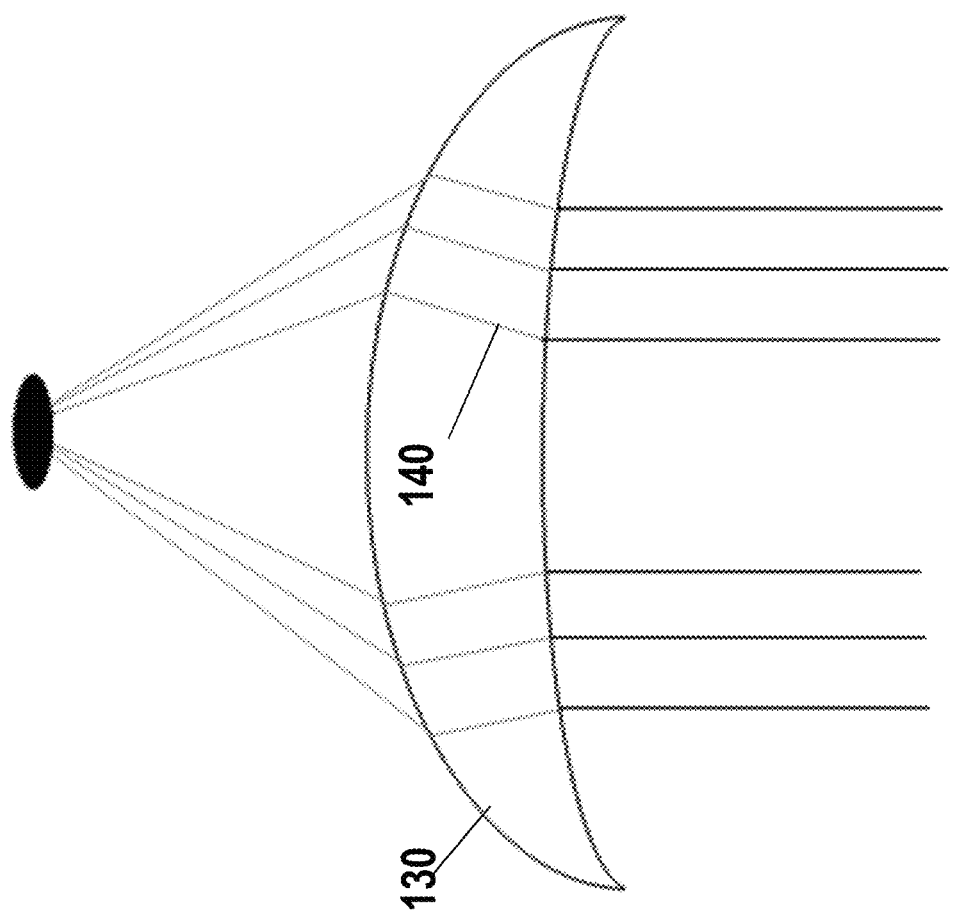
FIG. 9 shows another example of a mounting unit with a plurality of slots having varied length.

The mounting unit may have any suitable shape, dimension or geometrics. For instance, the mounting unit may have a substantially rectangular shape, oval shape, circular shape, ring shape, arc shape, triangular shape, square shape, or any other shape. As mentioned above, the array of slots may or may not have the same length so long as the output end of the optical fibers can be affixed or connected to the mounting unit. The end surfaces of the slots may or may not be aligned along a vertical direction. FIG. 9 shows another example of a mounting unit 130 with a plurality of slots 141 having varied length. In some cases, the end surfaces of the slots may follow a profile of a front side 133 of the mounting unit 130. The front side may be the side where the plurality of light beams emitted from. In the illustrated example, the mounting unit 130 may have an arc front side such that the plurality of end surfaces may be aligned to an arc profile. In some cases, this may further affect the distribution of the output light beams 144 (e.g., collimate, diverge or converge the output light beams).

A slot may have any suitable cross-sectional shape or dimensions. The cross-section of the slot may have, for example, a circular shape, half-circle shape, arc shape, triangular shape, V shape, D shape, C shape, W shape, O shape, rectangular shape, square shape, and various others. The slot may have a dimension to accommodate at least a portion of an optical fiber or the output end of the optical fiber circumferentially as long as the direction of the optical fiber can be guided by the slot. In some cases, the slot may have a width or width of the opening that is greater than or equal to the dimeter of the output end of the optical fiber. Alternatively, the width is smaller than the diameter of the optical fiber. The width of the slot may be, for example, no more than 0.05 mm, 0.1 mm, 0.2 mm, 0.3 mm, 0.4 mm, 0.5 mm, 0.6 mm, 0.7 mm, 0.8 mm, 0.9 mm, 1 mm, 2 mm or any number greater than 2 mm. The cross-section of a slot may be constant. Alternatively, the cross-section of a slot may be variable. For instance, when the cross-section of an optical fiber may be variable, the slot may be designed to accommodate the variable cross-section of the optical fiber.

Figure 10:
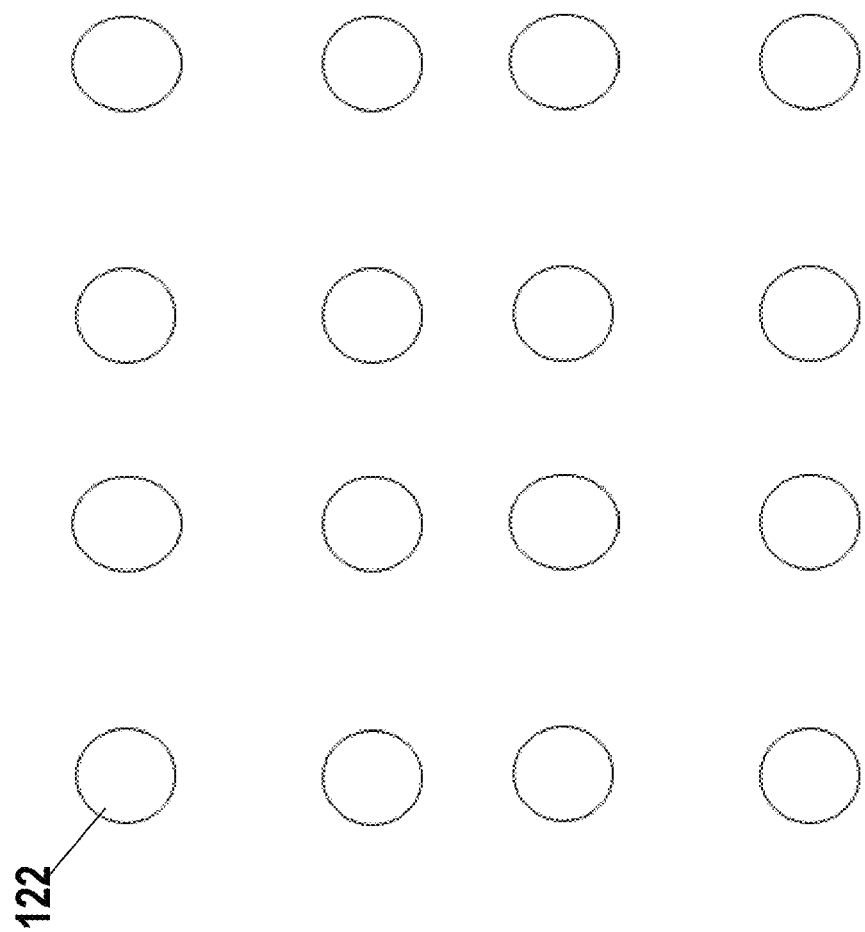
FIG. 10 shows examples of slots, in accordance with some embodiments of the invention.
Figure 12:
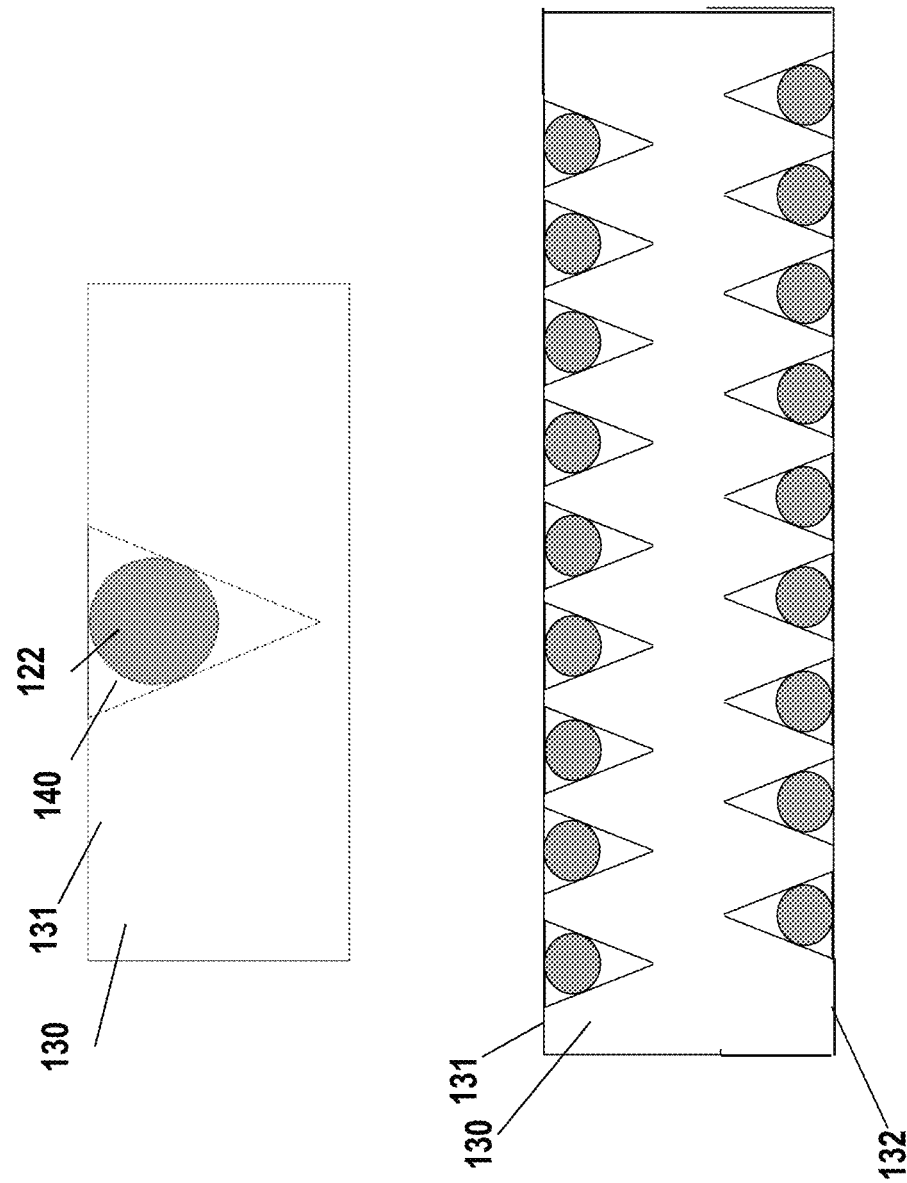
FIG. 12 shows examples of two or more mounting units collectively forming arrays of slots FIG. 13 schematically illustrates a set of light sources optically coupled to a set of optical fiber elements, in accordance with some embodiments of the invention.

FIG. 10 shows exemplary slots with a cross-section in V shape, in accordance with some embodiments of the invention. In the illustrated example, the slot 141 may have a V shaped cross-section. The slot may have a width at the opening greater than the diameter of the optical fiber such that the optical fiber can be entirely fit inside or enclosed by the slot circumferentially. Alternatively, a circumferential portion of the optical fiber (e.g., half circle, ¼ circle) may be accommodated inside the slot. In some cases, attachment methods may be used to fix the optical fiber to the mounting unit. Any suitable attachment method may be utilized, including but not limited to, bonding with an adhesive or epoxy (e.g., using an ultraviolet-cure (UV-cure) adhesive, glue, a two-part epoxy, a thermally conductive epoxy, or an electrically conductive epoxy), welding, brazing, soldering, mechanical fastening (e.g., with one or more screws, flanges, interlocking connections, friction, snaps, locks, clips, rails), or any suitable combination thereof. In some cases, a slot and a bottom side of another mounting unit may form an enclosure to hold the optical fiber in place (as shown in FIG. 12).

An array of slots 141 may be formed on a first side 131 of the mounting unit 130. Alternatively, arrays of slots may be formed on two or more sides of the mounting 130. As shown in the example of FIG. 10, arrays of slots 141 are formed on two opposing sides 131, 132 of the mounting unit, respectively. The two arrays of slots may or may not have the same layout (e.g., spacing or distribution may or may not be the same). The two arrays of slots formed on the two opposing sides may or may have the same cross-sectional shape. The two arrays of slots formed on the two opposing sides may be interleaved or aligned along the width direction of the mounting unit 130.

Figure 11:
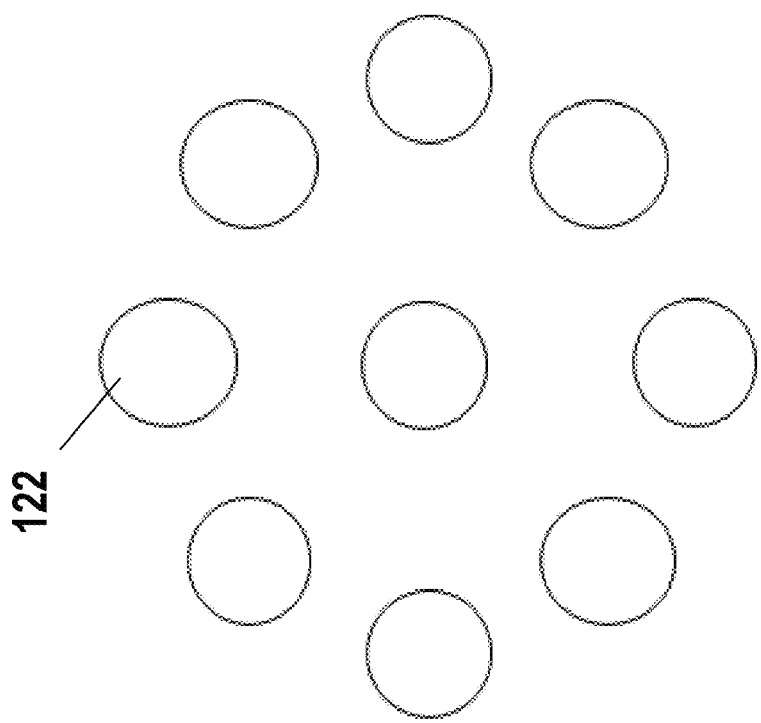
FIG. 11 schematically shows a cross-section view of a plurality of slots selectively connected to one or more optical fiber elements.

FIG. 11 schematically shows a cross-section view of a plurality of slots 141 selectively connected to one or more optical fiber elements 130. As shown in the example, any number of slots or any given subset of slots can be selected to receive or couple to optical fiber elements. In the case when arrays of slots formed on two or more sides of the mounting unit, the (number of) slots selected from each array may or may not be the same.

The mounting unit may be stackable. In some cases, two or more of the mounting units may be stacked to scale up the capability of the Lidar system. For example, two or more mounting units may be stacked to increase the total number of lines in the vertical direction, increase the density of light beams in a desired region so as to improve angular resolution in the vertical plane or horizontal plane. Two or more mounting units can be stacked together to form various configurations. For instances, the mounting units can be stacked along a length direction or width direction.

FIG. 12 shows examples of two or more mounting units 130-1, 130-2 collectively forming arrays of slots. As shown in scenario A, two or more mounting units 130-1, 130-2 may be stacked along the width direction such that a two-dimensional array of slots may be formed. Any number of mounting units, such as 2, 3, 4, 5, 6, 7, 8, 9, 10 or more may be stacked along the width direction. In the illustrated example, an array of slots may be formed on a top side 131-1, 131-2 of a mounting unit 130-1, 130-2. Two or more mounting units 130-1, 130-2 may be stacked together in the same orientation such that a bottom side 132-1 of one mounting unit 130-1 may face the top side 131-2 of another mounting unit 131-2. In some cases, the two sides facing each other may be in direct contact such that the bottom side 132-1 of the mounting unit 130-1and the slots 141 may form an enclosure to hold the optical fiber elements 120 in place. Alternatively, the two sides facing each other may not be in direct contact. For instance, two or more mounting units may be affixed to an external structure (e.g., rack or supporting structure) supported by the Lidar system.

The mounting units can be stacked together in any other suitable configurations, For example, as shown in scenario B, two or more mounting units may be stacked face-to-face such that a top side of one mounting unit may face the top side of another mounting unit. Different stacking configurations may provide various layouts of the slots. For instance, the spacing between two arrays of slots in scenario B may be smaller than the spacing in scenario A. This provides benefit to allow for a configurable and flexible layout of light beams by varying the stacking configuration of the mounting units.

In some cases, two or more mounting units can be stacked along a length direction as shown in scenario C. This may provide capability to scale up the number of lines of the Lidar system, increase a range of the vertical field of view, increase angular resolution, optimize light beams distribution, and improve energy efficiency and various others.

The arrays of slots formed on different mounting units may or may not have the same distribution. In some cases, the multiple mounting units may collectively form a desired slot distribution pattern in the vertical direction or horizontal direction. In some instances, the multiple mounting units may be the same whereas different subset of slots may be selected from each mounting unit for coupling optical fiber elements so as to collectively form a desired light beam distribution. For instance, when two mounting unit stacked up along the length direction (e.g., vertical direction), more slots close to the middle portion of the total length may be selected for receiving/coupling optical fiber elements.

The multiple mounting units can be stacked or combined to form a collection of slots. The multiple mounting units may be attached to one another or attached to an external structure such as a supporting body or a rack affixed to the Lidar system. Various coupling methods can be utilized to couple the mounting units, including but not limited to, bonding with an adhesive or epoxy (e.g., using an ultraviolet-cure (UV-cure) adhesive, glue, a two-part epoxy, a thermally conductive epoxy, or an electrically conductive epoxy), welding, brazing, soldering, mechanical fastening (e.g., with one or more screws, flanges, interlocking connections, friction, snaps, locks, clips, rails), or any suitable combination thereof.

The mounting unit 130 may be composed of any suitable material. In some embodiments, the material may be selected to have a relatively low coefficient of thermal expansion. For example, the mounting unit 130 may be made from a material having a coefficient of thermal expansion of less than $4 \times 10^{-6}$ K$^{-1}$, such as for example, a glass material, a lithium-aluminosilicate glass-ceramic, Invar, or a silicon-based material. Having a relatively low coefficient of thermal expansion may allow the optical fiber elements mounted to the mounting unit to maintain optical alignment in the presence of environmental temperature variations.

In some embodiments, the set of optical fiber elements may be optically coupled to a set of light sources. The plurality of light sources may be configured to generate laser beams or pulses of light. In some embodiments, the wavelength of the laser beam may be between 895 nm and 915 nm (e.g., 905 nm). This wavelength range may correspond to infrared light which are invisible and penetrative, which can improve the detection range of the Lidar and prevent disturbance to the environment. The wavelength of the laser beam can be in any other range depending on the specific application. In some cases, a light source may comprise at least a laser diode and a driver circuit.

Figure 13:
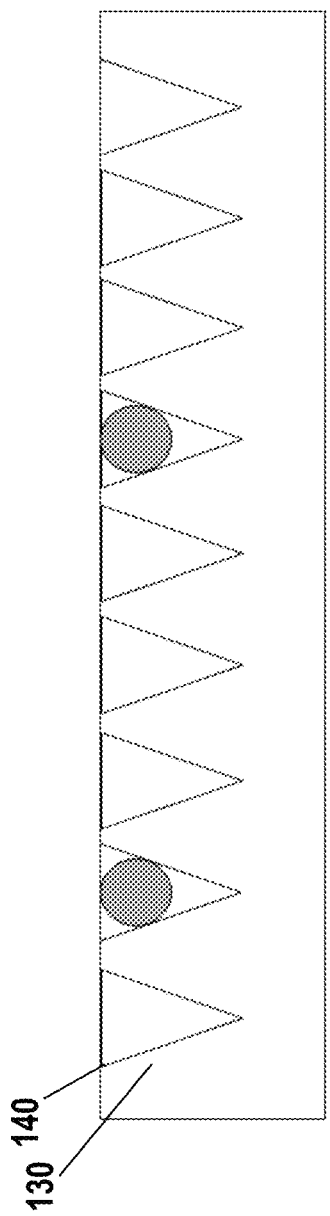

FIG. 13 schematically illustrates a set of light sources 110 optically coupled to a set of optical fiber elements 120, in accordance with some embodiments of the invention. The number of light sources may be equal to or less than the number of optical fibers. Alternatively, the number of light sources may be greater than the number of optical fibers. Each light source may be coupled to one or more optical fibers. In some cases, a light source may be coupled to one or more optical fibers via an optical coupling element 111.

An optical coupling element in some cases may be a demultiplexer which may include a 1×N fiber-optic power splitter with one fiber-optic input port and N fiber-optic output ports. As an example, an optical-power splitter may include one or more fused biconical taper (FBT) splitters which are assembled by placing two or more fibers adjacent to one another and then fusing the fibers together by applying heat. As another example, an optical-power splitter may include a planar lightwave circuit made by fabricating optical waveguides on a glass substrate using a lithographic process. Alternatively, the coupling element may not need to comprise a fiber-optic power splitter when a light source may be coupled to single optical fiber element.

Alternatively, in some cases, an optical coupling element may be a cylindrical lens. As an example, the light source may be a laser diode, and a cylindrical lens may be arranged at a proper distance from the emitting surface of the laser diode to compress the divergent angle of the laser diode. An input end of one optical fiber may be arranged at the focal plane of the cylindrical lens to couple the light beam of the laser diode into the optical fiber. In some cases, the input ends of two or more optical fibers may be arranged at the focal plane of the cylindrical lens to couple and split the light beam of the laser diode into the two or more optical fibers. The fraction of light coupled to each optical fiber may be determined by the properties or parameters of the two or more optical fibers (e.g., NA), and by the arranged positions of the input ends of the two or more optical fibers corresponding to the emitting surface of the laser diode.

A light source may be coupled to any number of optical fiber elements 120-1, 120-2. A light source may, in some cases, be coupled to multiple optical fiber elements. The multiple optical fiber elements coupled to the same light source may or may not have the same properties or parameters. In some cases, different properties of the optical fiber element may be selected based on beam quality requirement, detection range requirement, energy efficiency requirement and various others. In an example, optical fiber elements (e.g., optical fiber element 120-1) corresponding to the light beams emitted into the middle region may have a higher NA for higher light beam power and longer distance range. In some cases, the optical fiber elements (e.g., optical fiber element 120-2) corresponding to the light beams emitted into the lower or higher region such as directed to the ground or to the sky may have a lower NA.

In some cases, the multiple optical fiber elements coupled to the same light source can be the same (e.g., same NA, same operating mode, etc) where the optical coupling unit may be used to control the fraction of light coupled to each optical fiber element. For example, the fraction of light coupled to the optical fiber element corresponding to light beam emitted to a long range may be greater than the fraction of light coupled to the optical fiber element corresponding to a short range. In the illustrated example, the fraction of light coupled to optical fiber element 120-1 may be greater than the fraction of light coupled to optical fiber element 120-2.

In some cases, the plurality of light sources 110 may have a mapping relationship to an emission end or the mounting unit 130. For instance, the mapping relationship may comprise a given light source and the corresponding one or more slots in the mounting unit 130. A light source can be mapped to any slot located in any location in the mounting unit 130. The spatial configuration of light sources needs not be spatially mapped to the arrangement of the slots. For example, a light source 110-1 corresponding to a slot positioned beneath another upper slot may be spatially positioned above the light source 110-2 corresponding to the upper slot. In some cases, the mapping relationship may store information about the light source (e.g., device ID or index) and the corresponding slot(s) (e.g., angle, location, slot # and the mounting unit #). In some cases, the mapping relationship may store information about the light source (e.g., device ID/index), the corresponding slot (e.g., angle, location, slot # and the mounting unit #), and the optical fiber element (e.g., optical fiber ID/index). This may allow the control system to control the plurality of light beams to form a desired scanning pattern based on the mapping relationship.

In some embodiments, the plurality of light sources may be electrically coupled or communicatively coupled to a controller. The controller may also be electrically or communicatively coupled to a scanner or receiver. In some cases, the controller may receive electrical trigger pulses or edges from the light source, where each pulse or edge may correspond to the emission of an optical pulse by the light source. In some cases, the controller may provide instructions, a control signal, or a trigger signal to a light source indicating when the light source should produce optical pulses. The controller may send an electrical trigger signal that includes electrical pulses, where each electrical pulse results in the emission of an optical pulse by the light source. In some cases, the frequency, period, duration, pulse energy, peak power, average power, or wavelength of the optical pulses produced by the light source may be adjusted based on instructions, a control signal, or trigger pulses provided by controller.

In some embodiments, the controller may be configured to store or access a mapping relationship between the set of light sources and the emission end (e.g., corresponding slots or location of the output end of the optical fibers). The mapping relationship can be the same as the mapping relationship as described above. The controller may generate instructions or signals to control the light sources to achieve a desired light beam distribution based on the mapping relationship.

Figure 14:
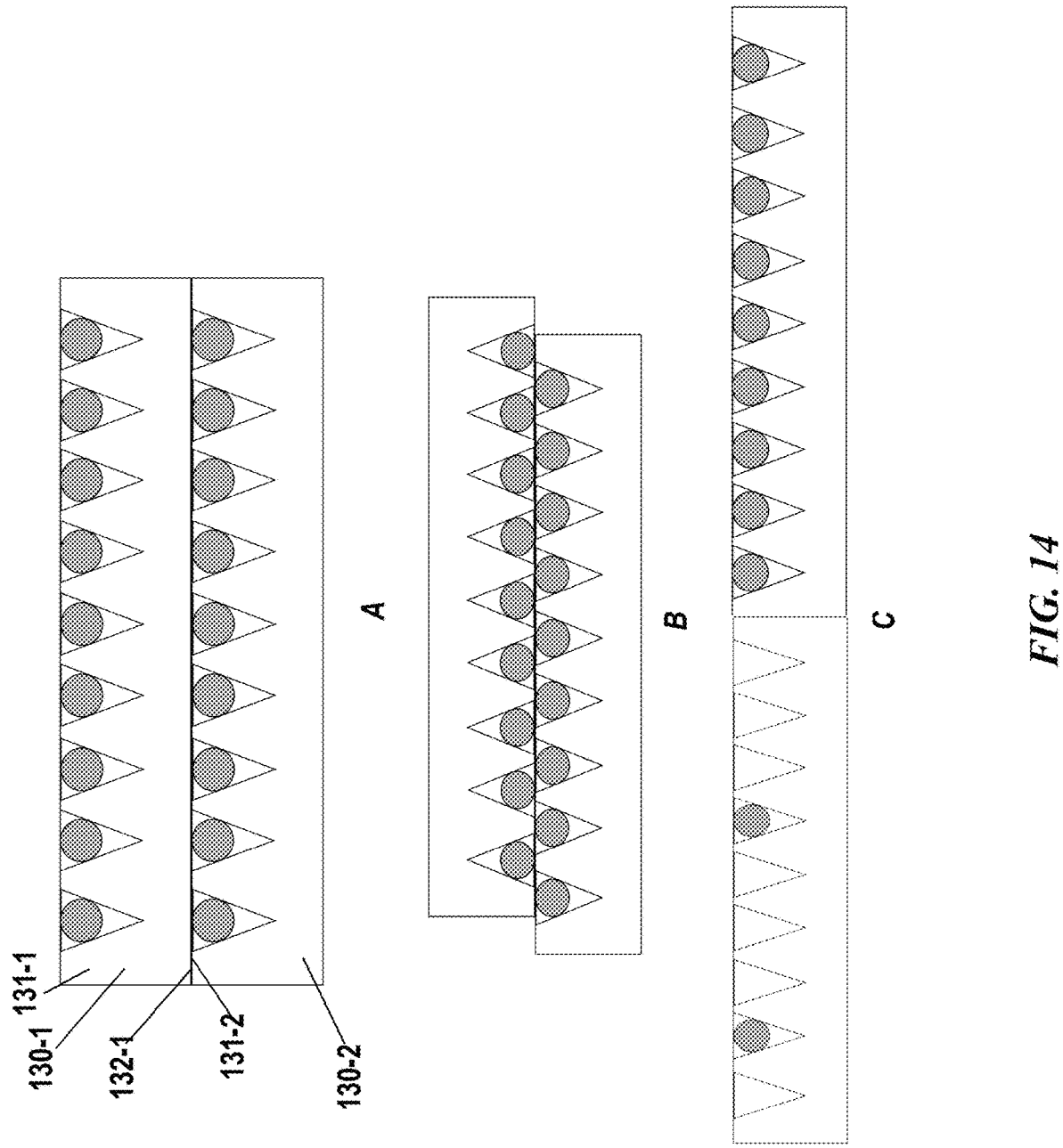
FIG. 14 show an example of two-dimensional arrays formed by a plurality of optical fiber elements.
Figure 15:
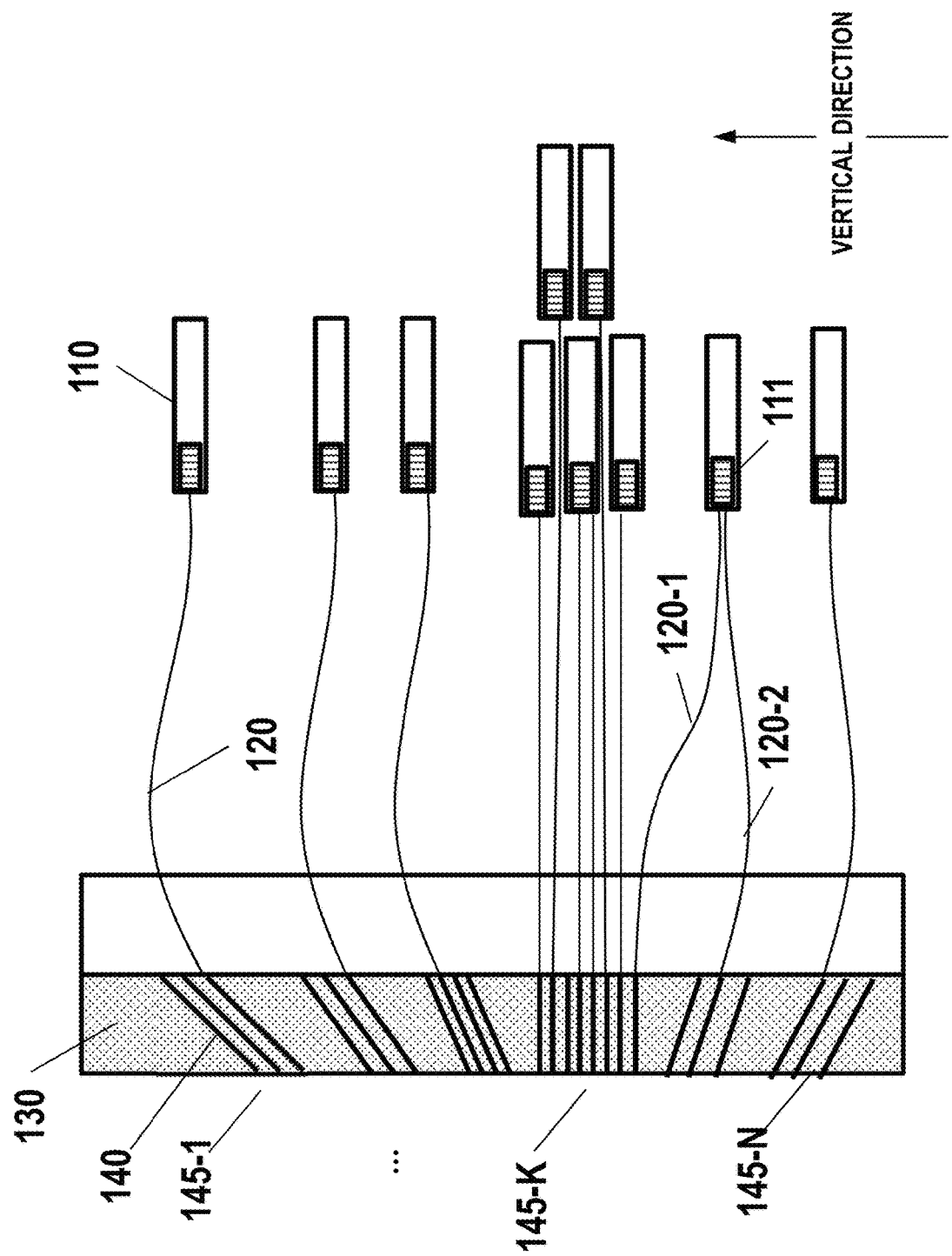
FIG. 15 show an example of two-dimensional arrays formed by a plurality of optical fiber elements.

In some embodiments, the plurality of optical fiber elements may form a two-dimensional array. The plurality of fiber elements can be configured to form any suitable pattern. FIG. 14 and FIG. 15 show examples of two-dimensional arrays formed by a plurality of optical fiber elements 120. The layout or arrangement of the emission end or output end 122 of the plurality of optical fiber elements may be controlled by the distribution of slots on each mounting unit, the stacking configuration of multiple mounting units, and or the selection of slots from the plurality of slots on each mounting unit.

The two-dimensional array may have any suitable pattern or distribution. For example, the two-dimensional array or matrix may be rectangular grid, hexagonal matrix, array with random spacing or distribution and various others. The matrix may comprise any number of optical fiber elements. For example, the matrix can be a M×N matrix with M and N being any number from 1 to 100.

The density of the array may or may not be uniform. For instance, the center region may have a denser concentration of optical fiber elements than the peripheral regions. In some cases, the maximum density of the output end of the optical fiber elements may be greater than a conventional Lidar system. For instance, in a dense region, there may be at least 2, 3, 4, 5, 6, 7, 8, 9, 10 or more light beams per mm$^2$. The provided Lidar system may allow for a high vertical angular resolution, a high horizontal angular resolution, a high scanning rate, or an accurate scanning performance without requiring an excessive number of laser lines. Additionally, the provided Lidar system may allow for increased laser lines without excessive space or size of the Lidar system.

Figure 16:
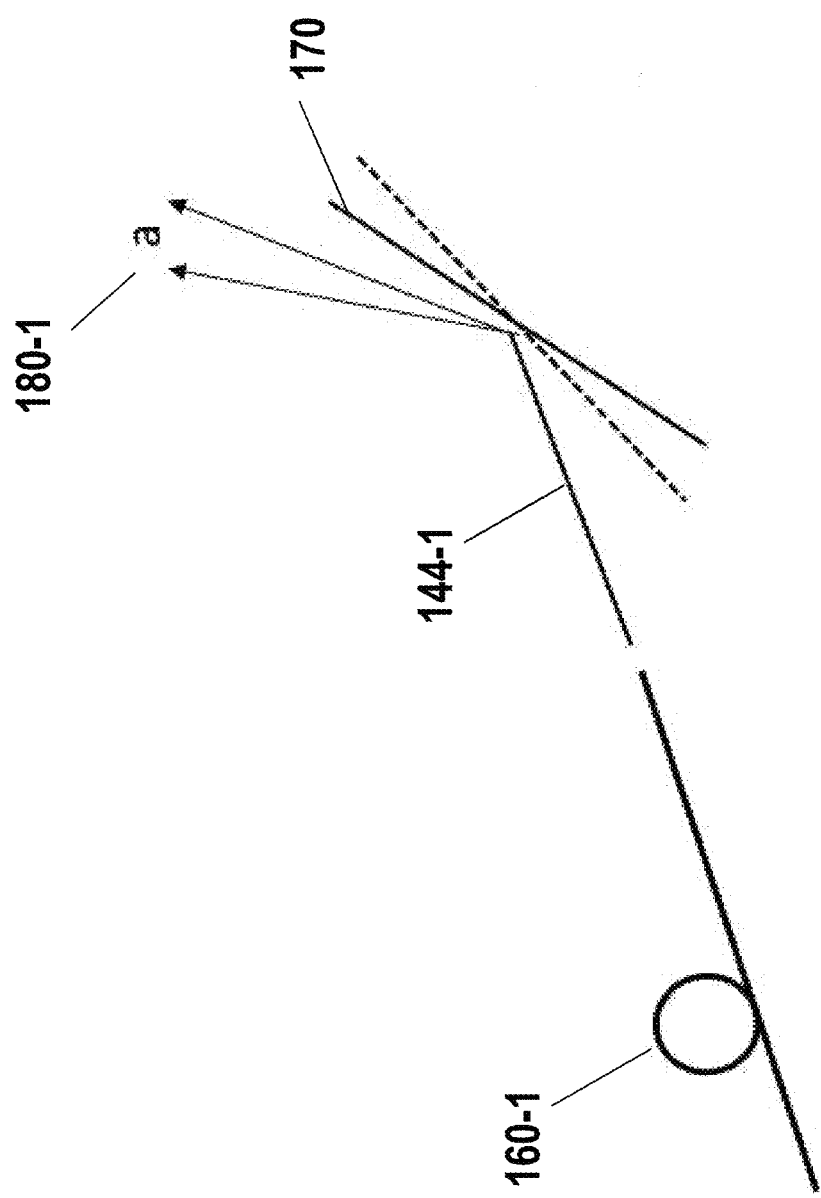
FIG. 16 schematically shows an example of an effective light source.
Figure 17:
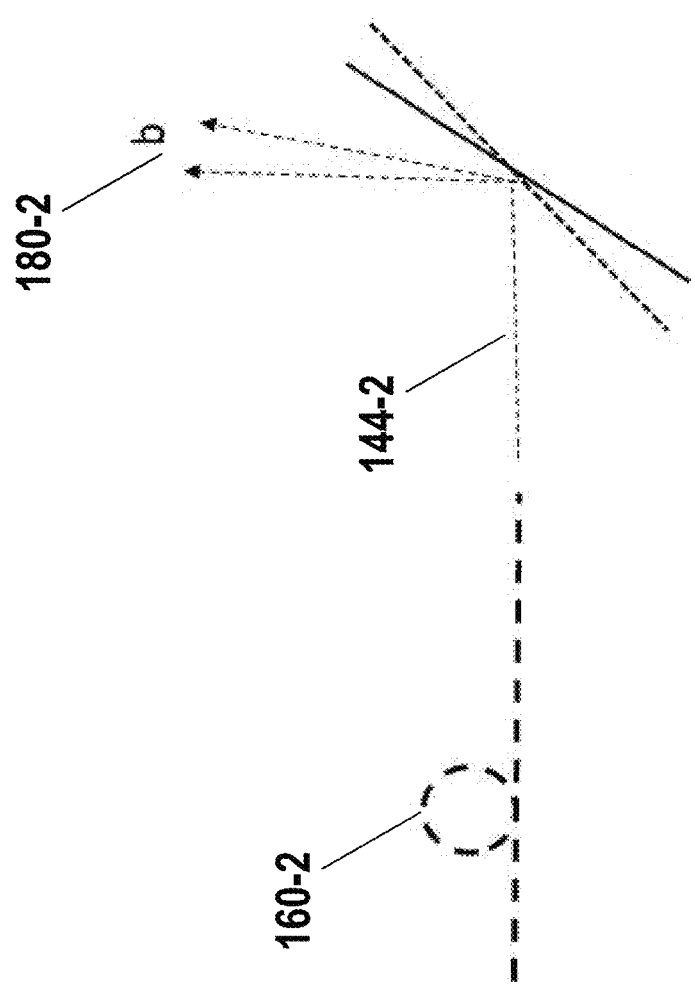
FIG. 17 schematically shows an example of an effective light source.
Figure 18:
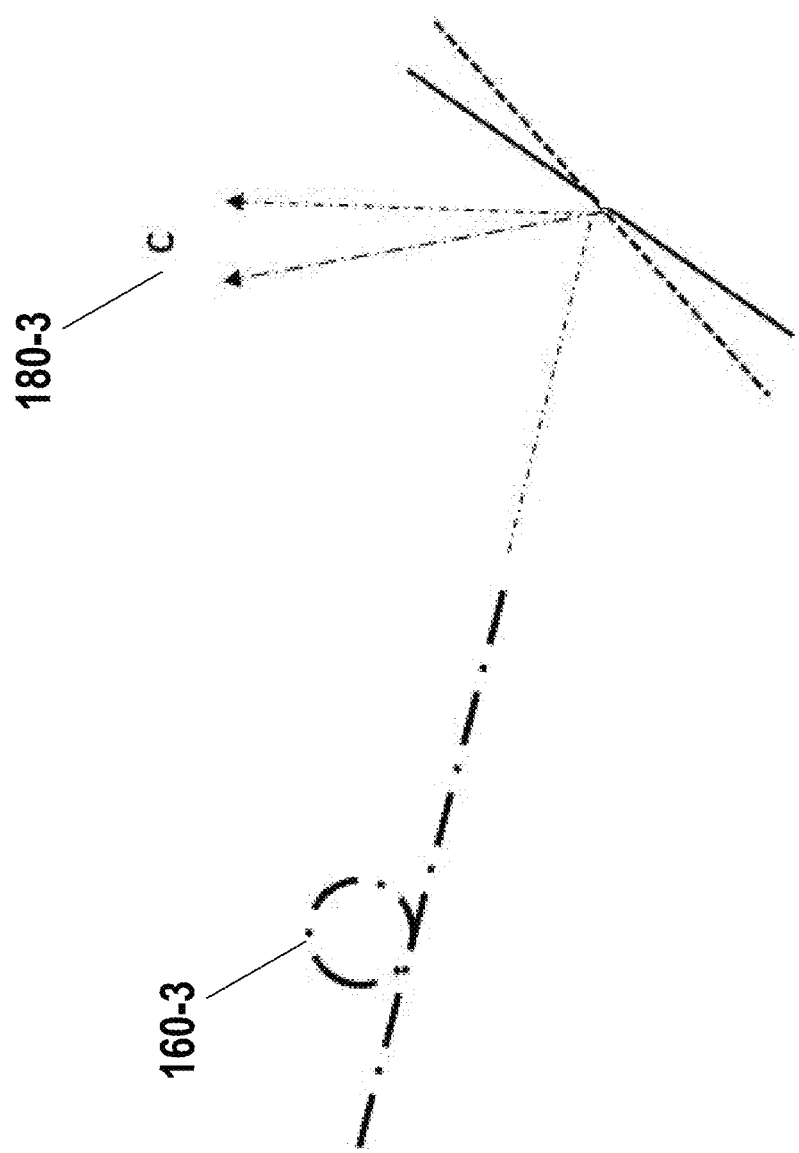
FIG. 18 schematically shows an example of an effective light source.

In some cases, a plurality of optical fiber elements may collectively form an effective light source. In some cases, by selecting different subsets of optical fiber elements or different subsets of slots, various effective light sources may be provided. FIGS. 16-18 schematically show different effective light sources 160-1, 160-2, 160-3. In some cases, the effective light sources may be different in terms of the beam distribution pattern (e.g., size, density, or power), direction of light beams, and various others. The various effective light sources may be formed by selecting different subset of slots or different subsets of optical fiber elements.

In some embodiments, a Lidar system may include a scanner 170 to steer the output beam 144-1 in one or more directions. As an example, scanner 170 may include one or more scanning mirrors that are configured to rotate, tilt, pivot, or move in an angular manner about one or more axes. In some cases, a flat scanning mirror may be attached to a scanner actuator or mechanism which scans the mirror over a particular angular range. As an example, a scanner 170 may include a galvanometer scanner, a resonant scanner, a piezoelectric actuator, a polygonal scanner, a rotating-prism scanner, a voice coil motor, a DC motor, a stepper motor, or a microelectromechanical systems (MEMS) device, or any other suitable actuator or mechanism. In some cases, a scanner 170 may be configured to scan the output light beam 144-1 over an angular range of at least 3 degree, 5 degree, 20 degree, 30 degree, 60 degree, or any other suitable angular range. As an example, a scanning mirror may be configured to periodically rotate over a 3 degree range, which results in the output beam scanning across a 6 degree range (e.g., a Θ-degree rotation by a scanning mirror results in a 2Θ degree angular scan of output beam 180-1).

In some cases, a scanner 170 may include one or more mirrors, where each mirror may be mechanically driven by a galvanometer scanner, a resonant scanner, a MEMS device, a voice coil motor, or any suitable combination thereof. A galvanometer scanner (which may be referred to as a galvanometer actuator) may include a galvanometer-based scanning motor with a magnet and coil. When an electrical current may be supplied to the coil, a rotational force may be applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror may be rotated using electromagnetic or electrostatic actuation. A voice coil motor (which may be referred to as a voice coil actuator) may include a magnet and coil. When an electrical current may be supplied to the coil, a translational force may be applied to the magnet, which causes a mirror attached to the magnet to move or rotate.

In some cases, a scanner 170 may include any suitable number of mirrors driven by any suitable number of mechanical actuators. As an example, a scanner may include a single mirror configured to scan an output beam 144-1 along a single direction (e.g., a scanner may be a one-dimensional scanner that scans along a horizontal or vertical direction). The mirror may be driven by one actuator (e.g., a galvanometer) or two actuators configured to drive the mirror in a push-pull configuration.

Figure 19:
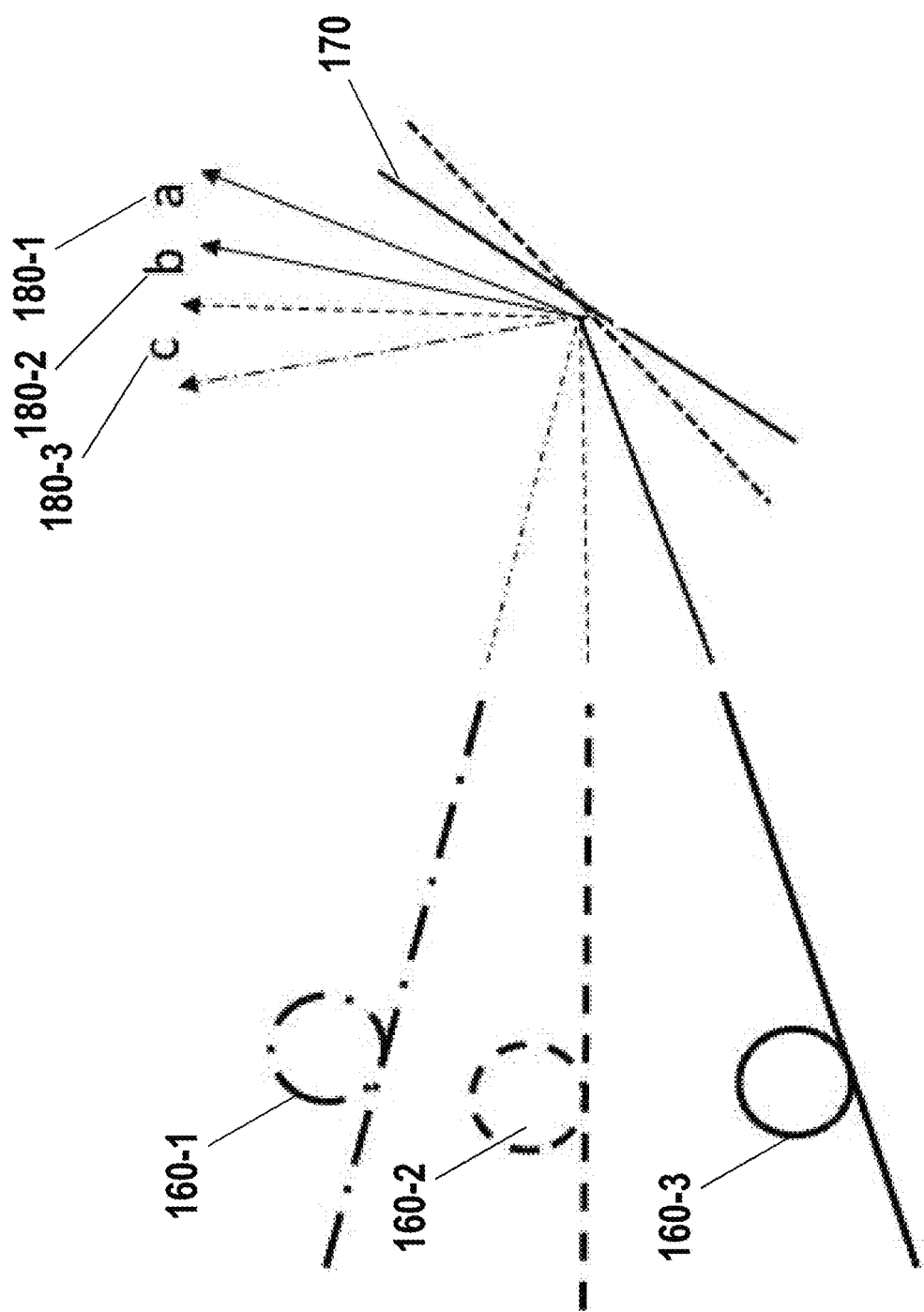
FIG. 19 schematically illustrates an example of multiple effective light sources configured to generate light beams steered by a scanner.

The effective light sources 160-2, 160-3 may be configured to generate light beams 144-2, 144-3 incident on the scanner at different angles resulting in different scanning regions or field of views 180-2, 1803. In some cases, various effective light sources may be provided to achieve a greater field of view without increasing the scanning range of the scanner. FIG. 19 schematically illustrates an example of multiple effective light sources 160-1, 160-2, 160-3 configured to generate light beams steered by a scanner 170. As shown in the example, by varying the selection of subsets of optical fibers or slots, different scanning region a 180-1, b 1802, c 180-3 or field of view may be achieved. In some cases, this may also allow the scanner 170 to scan in a smaller angle range without losing the field of view thereby increasing the scanning frequency.

The aforementioned light sources may be spatially decoupled from the emission end of the emitting apparatus. This may provide benefit to provide a Lidar system with improved performance by allowing for an optimized configuration of the light sources with less spatial restriction. For instance, the light sources may be organized or arranged to be in direct contact or in close proximity to a cooling device thereby improving the performance of the Lidar system. In some cases, the removal of heat from the light sources may provide for lower device operating temperature, and thus may improve device reliability. Additionally, lower operating temperature of the device may result in lower electrical resistance values for the stator and rotor conducting materials of the Lidar system. This may effectively reduce resistive losses in the system, which may translate into improved system efficiency. Additionally, stabilization of the temperature of a laser diode may provide for the laser-diode operating wavelength to be substantially stable.

Any suitable cooling methods can be utilized by the Lidar system. The cooling method can be passive cooling such as by arranging the light sources to be thermally coupled to a heat sink or other cooling feature (e.g., heat pipe, heat spreader, etc). Passive cooling may refer to dissipation of heat from a light source (e.g., laser diode, laser driver) by thermal contact with a heat sink or cooling fins. In some cases, a device, such as a fan, may be used to blow a gas/air over the surface of the cooling fins and/or heat sinks to aid in passive cooling. The cooling method can be active cooling such as utilizing a thermoelectric cooler driven by temperature controller to adjust or stabilize the laser-diode operating temperature.

Figure 20:
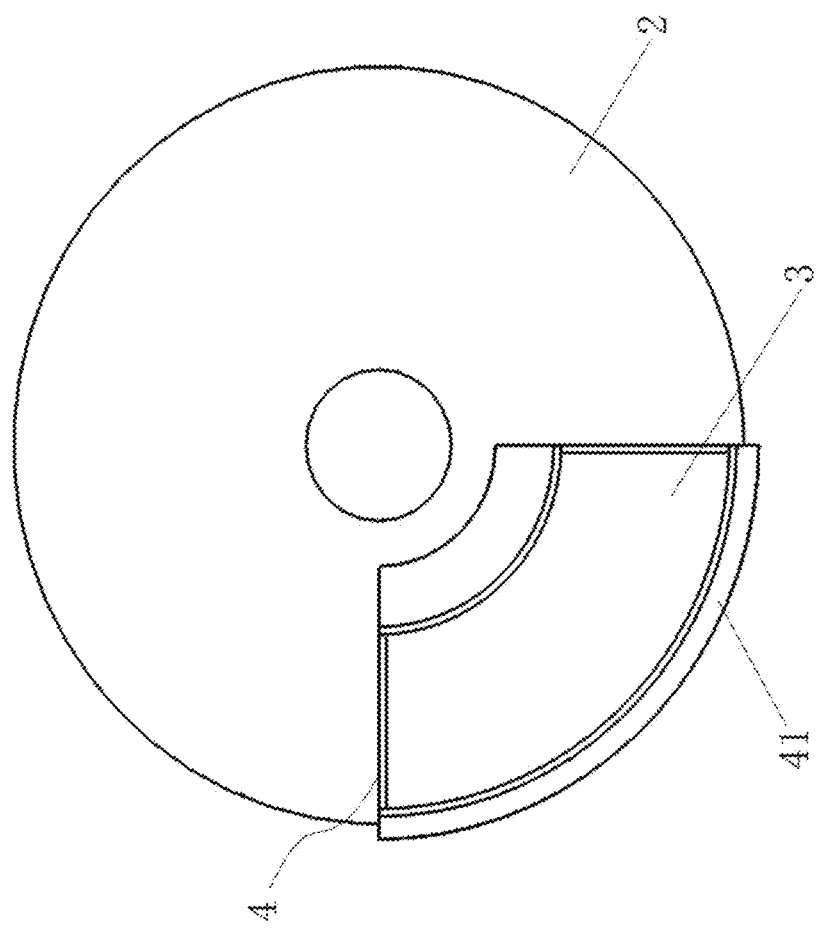
FIG. 20 shows an example of a plurality of light sources mounted on a plurality of heat sinks, in accordance with embodiments of the invention.
Figure 21:
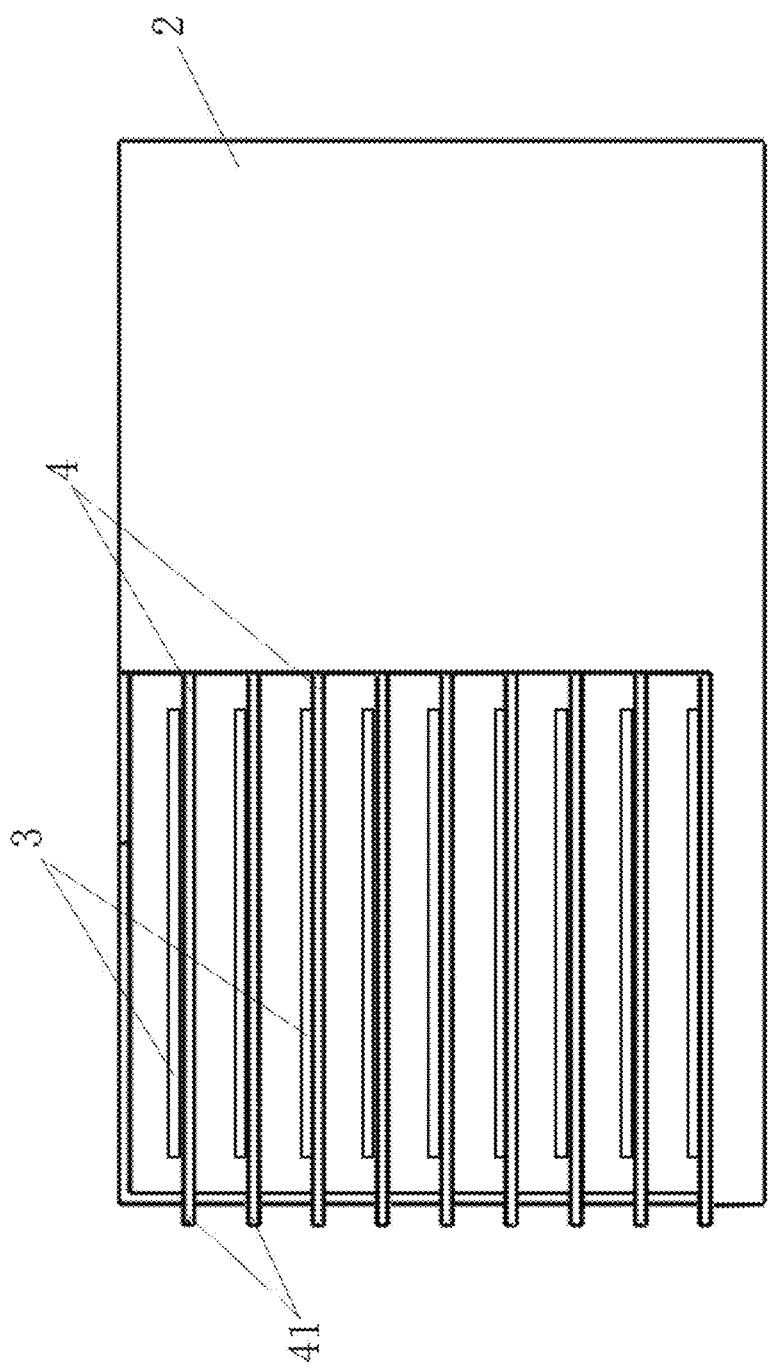
FIG. 21 shows another view of the plurality of light sources mounted on a plurality of heat sinks, in accordance with embodiments of the invention.

FIGS. 20-24 show various cooling features of the provided Lidar system, in accordance with some embodiments of the invention. FIG. 20 and FIG. 21 show different views of a plurality of light sources mounted on a plurality of heat sinks 4, in accordance with embodiments of the invention. In some cases, one or more lasers or light sources may be packaged into an emission board 3 each being in direct contact with a heat sink. In some cases, the emission board may have a case such that an external surface of the case may be in direct contact with the heat sink thereby removing excess heat generated by the electronic components (e.g., laser diode, laser driver) of the light source. Alternatively, the electronic components may not be enclosed by a case and the electronic components may be in direct contact with the heat sink. For instance, the semiconductor substrate of laser diode may be in direct contact with the heat sink. The heat sink and/or the case of the emission board may be made of thermal conductive material. For example, the heat sink 4 may be made from a material with a thermal conductivity of greater than $5 \text{ W m}^{-1} \text{ K}^{-1}$. The materials may include, but are not limited to, metals (such as copper, aluminum, brass, silver, gold, iron, steel, lead), diamond, carbon, or any alloy, mixture, or combinations thereof. Having a relatively high thermal conductivity may allow the heat sink to dissipate or remove heat produced by some of the electrical components mounted to the heat sink, for example, the laser diode, laser driver or other components.

Any number of heat sinks can be included in the Lidar system. For example, the plurality of light sources may be assigned to be located onto at least 2, 3, 4, 5, 6, 7, 8, 9, 10, 20 or more heat sinks. The plurality of heat sinks may be spaced apart for an improved heat dissipation result. For instance, the two adjacent heat sinks may be separated by at least 2 mm, 3 mm, 4 mm, 5 mm, 6 mm, 7 mm, 8 mm, 9 mm, 10 mm or more in the vertical direction. In some cases, the spacing between two adjacent heat sinks (at least in the vertical direction) may be greater than the vertical spacing between lasers in a conventional Lidar system. The plurality of heat sinks may be distributed uniformly. Alternatively, the plurality of heat sinks may be distributed in any configuration regardless of the distribution of light beams at the emission end.

In some cases, additional cooling features such as a thermoelectric cooler driven by temperature controller may be used to adjust or stabilize the light source (e.g., laser-diode) operating temperature. In the illustrated example, a plurality of fin features 41 extending from the heat sink may be used to further facilitate heat dissipation.

The emission board may be fixedly connected to the heat sink. The emission board can be attached to the heat sink using any suitable attachment means, including but not limited to, bonding with an adhesive or epoxy (e.g., using an ultraviolet-cure (UV-cure) adhesive, glue, a two-part epoxy, a thermally conductive epoxy, or an electrically conductive epoxy), welding, brazing, soldering, mechanical fastening (e.g., with one or more screws, flanges, interlocking connections, friction, snaps, locks, clips, rails), or any suitable combination thereof.

In some embodiments, the heat sinks may be fixedly connected to a rotor of the Lidar system. The heat sinks may be connected to the rotor directly or indirectly. For example, the heat sinks may be mounted to a supporting body which may be rotated by the rotor. In some embodiments, the heat sinks may be integrally formed with the rotor. In some cases, additional cooling feature such as a fan may be used to force air flow in the Lidar system which may aid in cooling effect of the Lidar system. In some cases, the emission boards or the heat sinks may be configured to be located at or in close proximity to the air flow path such that heat generated by the light sources can be removed by the air passing through.

Figure 22:
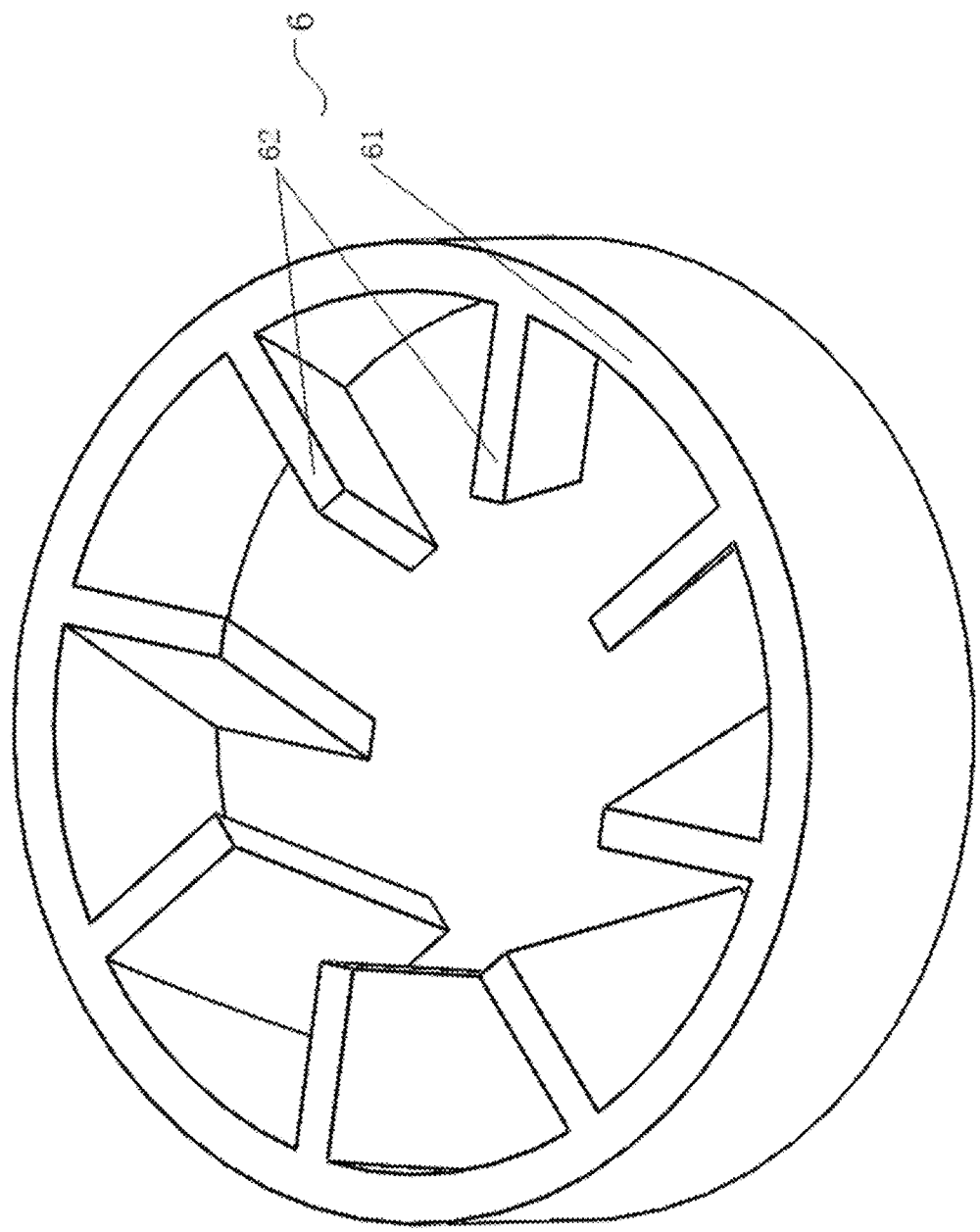
FIG. 22 shows an example of another cooling feature of the Lidar system, in accordance with some embodiments of the invention.
Figure 23:
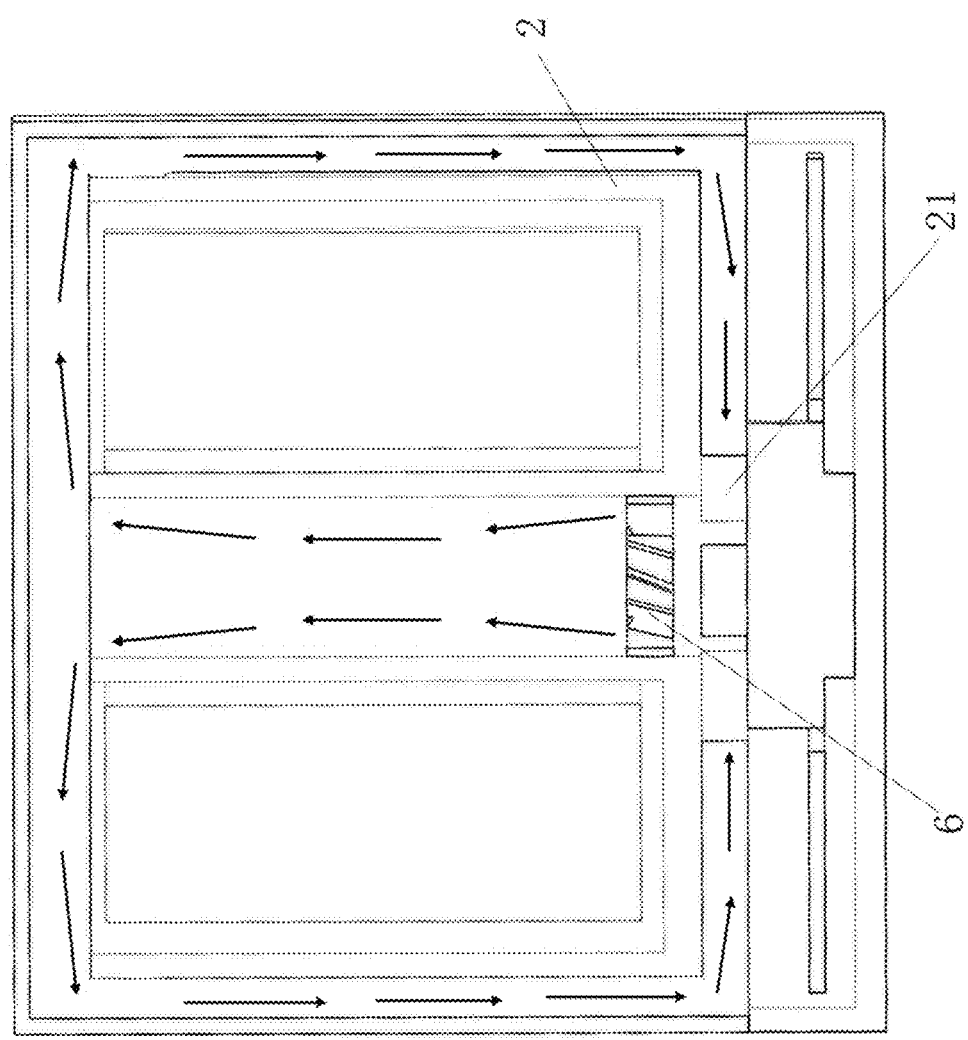
FIG. 23 shows an example of the cooling feature integrated to the Lidar system, in accordance with some embodiments of the invention.
Figure 24:
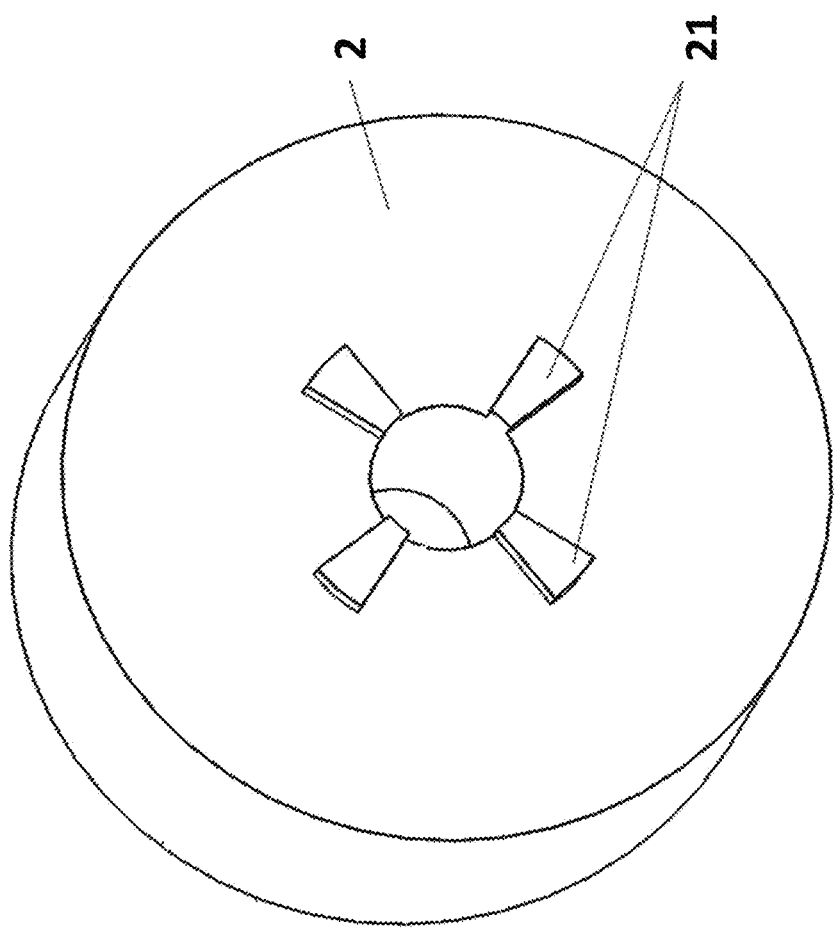
FIG. 24 shows an example of a supporting element of the Lidar system, in accordance with some embodiments of the invention.

FIGS. 22-24 show an example of another cooling feature of the Lidar system, in accordance with some embodiments of the invention. The cooling feature may be configured to force air flow in the Lidar system. In some embodiments, the cooling feature 6 may comprise a ring portion 61 and a plurality of blades 62. The plurality of blades can be of any suitable form or shape to promote air flow in the chamber of the Lidar system. In some cases, the cooling feature may be affixed to the rotating shaft or the rotor of the Lidar system such that the cooling feature may turn or rotate about a rotational axis of rotor.

A Lidar system may comprise a rotor and a stator. In an example of a Lidar system, a rotor may rotate about a rotating shaft 26. The cooling feature 6 may be attached to an inner surface of the rotating shaft 26. The rotor may be driven by a motor. A stator of the motor may be sleeved on an outer edge of rotating shaft 26 located between a fixing seat and the base 23. A rotor 2 of the motor rotates around the rotating shaft 26, and a power cable of the motor may be laid inside the channel or hole of the rotating shaft. The rotor of the motor may be connected to a rotation cavity or a supporting body such that the rotor may drive the rotation cavity to rotate around the rotating shaft 26. The rotation cavity may enclose the emitting device (e.g., light sources, mounting unit, optical fibers, optical components) described above. The rotation cavity may be fixed, by using a bearing, on an outer edge of the rotating shaft.

The aforementioned cooling feature 6 may be attached to the hole of the rotating shaft 26. When the cooling feature rotates with the rotor air may be forced to flow in the cavity to form a flow path 22. In some cases, air may be directed circumferentially or perimetrically around the rotor or the rotation cavity. The air may also be directed along the length of the shaft. In some cases, the cavity of the Lidar system may be sealed such that the air may be circulated inside the cavity driven by the cooling feature 6 to aid in heat exchange. The plurality of light sources or emission boards may then be designed to be located at the air flow path or in close proximity to the air flow path to promote heat exchange of the system. For example, the emission board may be located within 1 mm, 2 mm, 3 mm, 4 mm, 5 mm, 6 mm, 7 mm, 8 mm, 9 mm, 10 mm, 15 mm, 20 mm, 25 mm, 30 mm from the air flow path.

Any number of blades may be included in the cooling feature. For instance, at least two, three, four, five, six, seven, eight or more blades may be included. In an example, the blade may have a height in the range of 2 mm-8 mm. The spacing between adjacent blades may be in the range of 2 mm-50 mm. The cooling feature can be composed of any suitable materials such as plastic, metal or alloy metal. The ring portion and the blades may be integrally formed as a single component. Alternatively, the ring portion and blades may be separate components and assembled for form a cooling feature. The diameter of the hole may be substantially the same as the outer diameter of the ring portion 61 such that the cooling feature can be fixedly connected to the rotor/rotating shaft.

In some cases, one or more supporting elements 21 may be located beneath the cooling feature 6 to ensure there may be gap between the cooling feature and the base. This ensures the air flow path not be blocked by structures of the Lidar system. The supporting element 21 may comprise any suitable shape. Any number of supporting elements can be utilized as long as the air is not prevented from drawn into the cooling feature to form a circulation path.

The Lidar system may have an improved performance with aid of the cooling features and the organization of the light sources. For example, with the provided cooling features, the laser-diode operating temperature may be stabilized to within any suitable range of a target temperature set point, such as for example, within approximately ±0.01° C., ±0.05° C., ±0.1° C., ±0.5° C., or ±1° C. of a target temperature. Stabilization of the temperature of laser diode may provide for the laser-diode operating wavelength to be substantially stable (e.g., the peak wavelength of laser diode may vary by less than any suitable value, such as for example, less than approximately 0.1 nm, 0.5 nm, 1 nm, or 2 nm).

Figure 25:
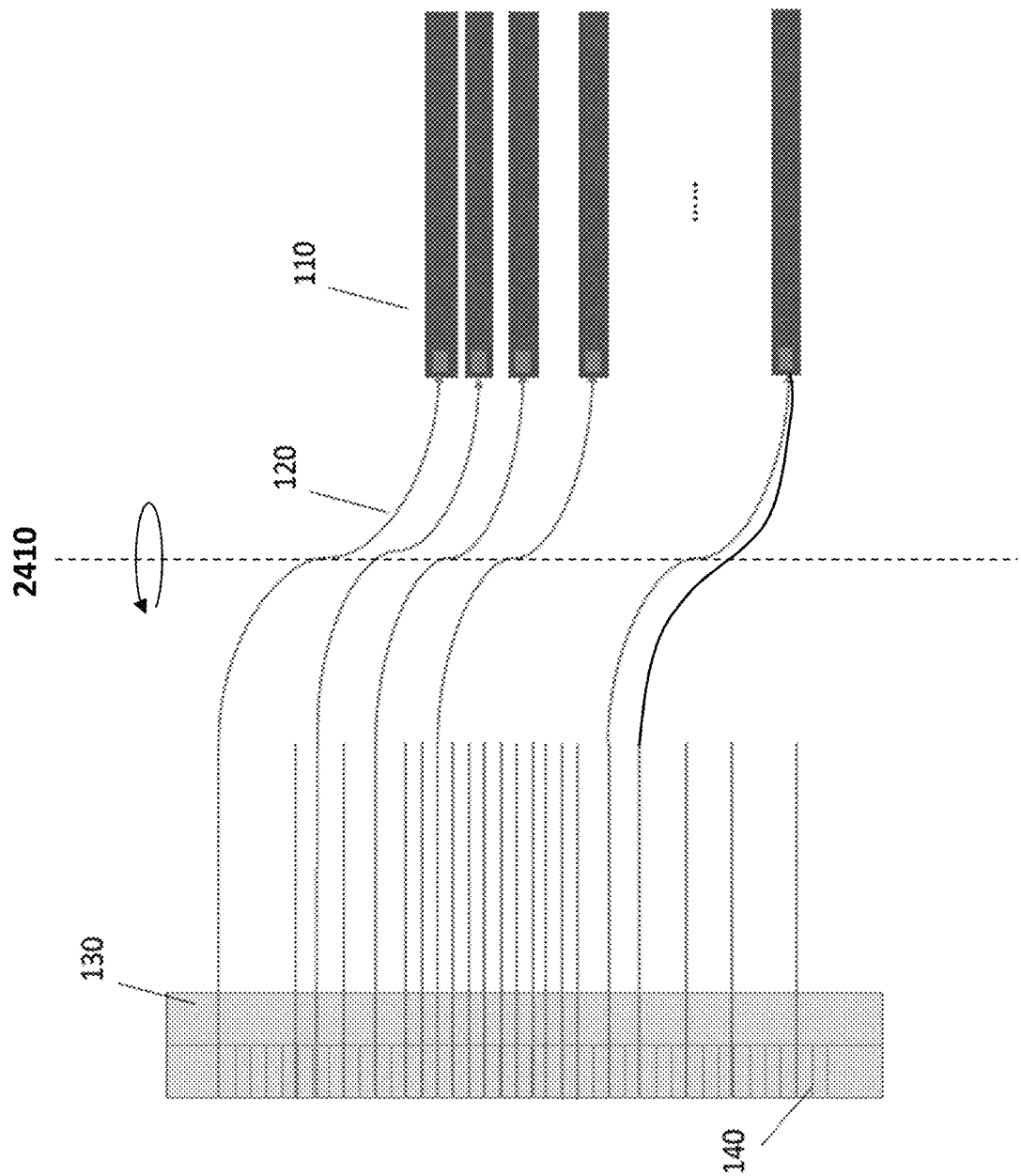
FIG. 25 schematically shows the motion of the light sources with respect to an emission end (e.g., mounting unit).

In some embodiments, use of flexible optical fibers to couple the light sources and the emission end of the emitting apparatus may allow for an optimized overall design of the Lidar system. FIG. 25 schematically shows the motion of the light sources with respect to an emission end (e.g., front end of mounting unit 130).

The Lidar system may comprise a receiving apparatus. The receiving apparatus may comprise a plurality of detectors configured to receive the echo beams. Each of the detectors corresponds to one of the lasers and may be configured to receive light originated from the corresponding laser. The receiving apparatus may also be referred to as a receiver which includes a detector (e.g., photoreceiver, optical receiver, optical sensor, photodetector, or optical detector). In some cases, a receiver may include one or more avalanche photodiodes (APDs) or one or more single-photon avalanche diodes (SPADs). In some cases, a receiver may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions).

In some cases, the plurality of light sources 110 and the emission end such as the front end of the mounting unit may be separated by at least 5 mm, 1 cm, 2 cm, 3 cm, 4 cm, 5 cm, 10 cm, or more. The light sources can be located in any location in the Lidar system. In some cases, the light sources, mounting unit and the receiving apparatus are all mounted on to fixedly coupled to the rotor such that the light sources and the mounting unit are both rotated about the rotational axis 2410. In some cases, the light sources may be located at the stator whereas the mounting unit and receiving apparatus are located on the rotor of the Lidar system. The light sources may be rotatably coupled to the optical fiber elements allow for the light sources not rotated with the rotor.

The Lidar system may be provided on a movable object to sense an environment surrounding the movable object. Alternatively, the Lidar system may be installed on a stationary object.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

In some cases, the movable object can be an autonomous vehicle which may be referred to as an autonomous car, driverless car, self-driving car, robotic car, or unmanned vehicle. In some cases, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In some instances, the Lidar systems may be integrated into a vehicle as part of an autonomous-vehicle driving system. For example, a Lidar system may provide information about the surrounding environment to a driving system of an autonomous vehicle. In an example, the Lidar system may provide a 360 degree horizontal field of view of the vehicle. An autonomous-vehicle driving system may include one or more computing systems that receive information from a Lidar system about the surrounding environment, analyze the received information, and provide control signals to the vehicle's driving systems (e.g., steering wheel, accelerator, brake, or turn signal).

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" is used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

Obstacle detection is one of the key technologies in autonomous navigation system of unmanned vehicle. The detection of obstacles based on lidar sensor is an important method. The obstacle detection based on lidar sensor is an active detection method, and the active type may be also called contact type. The detection methods mainly include lidar, millimeter-wave radar, sonar and other methods. Lidar measures the distance between the emitted light and the reflected light by measuring the time interval between the emitted light and the reflected light. The laser has good monochromaticity, high brightness, high bit precision and high resolution, which can overcome the interference of ground clutter, and may be not affected by the light. Based on these advantages, lidar has been widely used in intelligent mobile unmanned platform navigation and real-time obstacle avoidance.

Lidar may be the "eye" of unmanned vehicles. It was originally used as a sensor for 3D laser scanning. However, with the increasing application in autonomous driving and robotics industry in recent years, the demand for lidar has also exploded, which greatly affects the development of unmanned vehicles.

In some cases, the present mechanical multi-line lidar may produce multi-line by multiplexing the same or a group of lenses with multiple laser sources, arranged at different heights on the focal plane of the lens. This produces different directivity in the vertical direction, forming multiple lines. Based on this basic idea, in order to improve the line number, lidar may arrange lasers at different heights of the transmitting mirror surface. The lower the height difference, the higher the line number and the higher the resolution of the line Angle. The normally used semiconductor laser pulse diode light emitting region may be small in size, but in fact the spacing between the lasers cannot be very small due to the size of the chip package and the drive circuit. Given this practical limitation, in order to achieve higher line number and higher angle resolution, it may be desired to realize the encryption of angle and increase of line number only by adding more column lasers in at least the horizontal direction, which will lead to the following situation:

1) The increase of the number of columns leads to difficulty in assembling and adjust, which complex the production process, and the lower the production efficiency.

2) Low space utilization rate in the system, especially crowded in the focal plane position, and the heat may be high, so the heat may be difficult to be derived.

3) Because angle encryption and line number increase through multiple columns, there are also different angles of horizontal direction between different columns. Such beam distribution may cause image distortion of lidar to objects moving quickly at close range.

4) The multi-column laser at the transmitting end leads to the multi-column detector at the receiving end, which makes it difficult to isolate the ambient light through the aperture and other means when the ambient stray light enters the radar path, and the ambient light noise leads to the decrease of the distance finding ability.

Mechanical rotary currently on the market, on the other hand, the lidar, due to the laser emission board requires very high positioning accuracy, there may be no guarantee that traditional machining parts, by external position adjustment or auxiliary fixture positioning, can fully fit with thermal conductivity material, that the fixture can only adopt the way of fixed glue, the glue of poor thermal conductivity, greatly reduces the heat effect of laser slab. In some situations, the heat dissipation path of the existing technology may be that the heat from the laser emission plate may be transferred to the fixing bracket of the circuit board through the glue, and then to the rotor, which conducts heat dissipation by convection between the rotor and the internal air. The conventional lidar system may suffer from poor thermal conductivity of glue, long heat dissipation path, or poor heat dissipation effect.

In order to solve the above technical problems, the invention proposes a lidar, which may comprise at least a laser light source and a laser emission optical system. The laser light source may be a distributed emission light source, which includes a laser, a coupled fiber and a fiber fixing device. The laser may be used for transmitting probe light;

one end of the coupling fiber may be coupled to the laser, and the other end may be the outgoing end face.

The fiber optic fixer may be used to fix the outgoing end face, and the optical fiber fixing device may be configured together with the outgoing end face of the coupling fiber to control the outgoing direction of the outgoing end face.

The light emitted by the outgoing end face may be incident to the laser emission optical system. Further, the laser light source may comprise a plurality of lasers. In some cases, the lasers may correspond to a plurality of coupled fibers in a one-to-one manner. The light emitted by the multiple lasers may be coupled one by one into the coupling fiber.

Further, the plurality of optical fibers may be fixed on the optical fiber fixator.

In some cases, the fiber fixator may have a first surface, which may be rectangular, crescent, triangular, circular, semicircular, semicircular or ¼ circular. Further, the surface of the fiber fixator has a microgroove structure for fixing the coupling fiber, or, the fiber optic fixator has a flat plate structure.

In some embodiments, the microgroove structure may be a cross-sectional "V" groove structure, and the "V" groove structure has the first side wall and the second side wall, and the first side wall and the second side wall are used to support the coupling fiber body.

In some cases, the outgoing light end face may be obliquely cut so that the outgoing light end face may be configured as a prism structure.

Further, the direction of the light emitting end surface may be controlled by configuring the inclined angle of the prism structure.

As a means of implementation, the lidar also includes a rotor structure, which includes a launch chamber, and the fiber optic fixer may be fixed inside the launch chamber.

As a means of implementation, the lidar also includes a rotor structure, which includes a launch chamber, and the fiber optic fixator may be fixed inside the launch chamber. The laser may be fixed on the outside of the launch chamber; the light emitted by the laser may be coupled to the interior of the launcher through the coupling fiber.

Further, the laser may be fixed on the wind tunnel of the rotor shell structure, and the coupling fiber may be coupled into the inner part of the rotor shell along the wind tunnel.

In some cases, the optical fiber fixator fixes the outgoing end face of the coupling optical fiber on the focal plane of the laser emission optical system.

The optical fiber fixation device fixes the outgoing end face of the coupled fiber to the near-axis position of the optical axis of the laser emission optical system.

Further, the lidar may comprise at least one heat sink plate and at least one laser emission plate, Further, the laser may be arranged on the laser emission plate, the heat sink plate may be connected with the rotor structure, the laser emission plate may be arranged on one side of the heat sink plate, and the laser emission plate may be connected with the heat sink plate to absorb the heat generated by the laser.

The heat sink plate may extend away from the center end of the rotor structure to form a heat fin.

Further, the rotor structure has a top surface, a bottom surface opposite the top surface, an inner side and an outer side, and the inner surface may be provided with at least one heat dissipation element, and the heat dissipation element may be provided with an inner side fixed to the rotor structure.

Further, the heat dissipation element comprises a fixed ring plate and a heat dissipation blade. The heat dissipation blade may be arranged on the inner wall of the fixed ring plate. A side edge of the heat dissipation blade may be fixedly connected with the fixed ring plate.

Further, the center of the rotor structure may be provided with a through hole through the underside and the top surface; the underside may be provided with a plurality of support blocks along the circumferential interval of the through-hole to ensure that the air duct may be not hindered.

By adopting the technical scheme, the lidar may have the following beneficial effects:

1) the lidar, by virtue of the soft characteristics of optical fiber, arranges the laser circuit in any position where the space may be easy to dissipate heat, pulls the fiber out and arranges on the focal plane, and separates the luminous area and heating area of the lidar, making the structure design of lidar more flexible.

2) the lidar of the invention uses light and can arrange more lines with fewer columns due to the size of the optical fiber, which can eliminate the limitation of the physical size of the encapsulation and drive circuit that directly arrange the laser and significantly improve the production efficiency.

3) the lidar of the invention may closely attach the laser emission plate to the metal heat sink plate, and the heat may be effectively transmitted to the heat sink plate; in addition, the heat sink plate extends out the heat sink fin. With the rotor's rotating characteristics, the heat sink fin and the air inside the lidar may form forced convection, thus greatly improving the heat dissipation effect.

4) mentioned in the present disclosure within the lidar, with rotor cooling components, metal heat sink and cooling combined with a lidar cover, the lidar in the process of running the internal air forced convection, the heat generated by the internal can be produced under the action of outside loop flow, avoid high temperature burn components, internal heat may be dispersed in a timely manner through the outer garment will radar, improve the cooling efficiency of the lidar and better performance.

In a possible embodiment, an output angle control device may be provided, as shown in FIG. 1. The device may comprise a laser light source 110, a first quantity of output optical fiber 120, and a fiber fixing device 130. The fiber fixing device 130 can be the same as the mounting unit as described elsewhere herein. The output optical fiber 120 can be the same as the optical fiber elements as described elsewhere herein.

The laser beam emitted by the laser light source 110 may be coupled to the outgoing fiber 120.

The optical fiber fixator 130 has a first surface, and the first surface may be arranged with a second number of optical fiber fixed groove 140. The outgoing optical fiber 120 may be fixed in the fiber fixed groove 140 and passes through the first surface, and the outgoing end face of the outgoing optical fiber 120 passes through the fiber fixed groove 140. The fiber fixed groove can be the same as the directional structure as described elsewhere herein.

In some cases, the outgoing end face of the outgoing optical fiber 120 and the fixed groove of the optical fiber 140 are configured to make the beam of the outgoing end face of the optical fiber converge according to the pre-determined angle.

The laser light source 110 may comprise a laser emission plate with multiple lasers, and the light emitted by the multiple lasers may be coupled to the multiple outgoing fibers. The number of laser transmitting end faces can be one or more. The light emitted by the laser light source may be coupled to the outgoing fiber through which the light emitted by the laser can be coupled to a small space. For example, a laser emitted by multiple lasers coupled to a small range of optical fiber fixtures allows for a small range of outgoing faces, each of which constitutes an equivalent source of light. Thus, a large number of equivalent light sources are concentrated in a small range. For example, 10 laser emission plates equipped with 4 lasers coupled the light emitted from the laser end face to a small area through 40 optical fibers, so as to achieve a high concentration of the outgoing area, which can use the light position close to the optical axis, thus preventing the aberration caused by the far-axial light. Of course, coupling multiple light sources of the laser emission chip to a small area may be also suitable for more light sources, such as 64 or more equivalent light sources realized by more than 64 lasers. When applied to lidar, this facilitates high-wire beam scanning. In this embodiment, a single laser can also be used, with multiple lasers coupling multiple fibers one by one. One end of the light section may be coupled to the laser, and the other end may be fixed to the optical fiber fixture as the outgoing face.

In FIG. 1, the laser emitted from the laser emission end face may be coupled to the said multiple outgoing optical fiber 120. By providing multiple laser emission chips, the provision of complex light sources can be realized, while the multiple optical fiber 120 may be fixed on the optical fiber fixation device 130. By adjusting the optical fiber fixation device 130, the outgoing direction of the optical fiber can be adjusted.

As shown in FIG. 8, the optical fiber output angle can be controlled by adjusting the inclination angle of the optical fiber fixed groove 140 on the optical fiber fixation device 130. Specifically, the orientation Angle of the stationary groove can be adjusted to control the output Angle of the fiber. For example, adjacent fiber-optic fixed slots 140 are arranged as divergent lines. The end face of the fiber ensures that the output light of the end face may be emitted basically along the direction of the end face of the fiber. In this way, the output end face of the fiber and the fixed groove of the fiber can be configured so that the light beam from the end face of the fiber can converge according to the pre-determined angle.

The specific configuration method can include: the outgoing end face of the fiber may be flat, and the fixed groove of the fiber may be configured according to the radial direction of the divergent line. Through your fingers straight face may be the radial cross section perpendicular to the fiber, as shown in FIG. 3, the emergence of the fiber optical vertical incidence optical fiber end face, therefore, basically from the fiber end face vertical emergent, this way can guarantee the beam has a good directional, fiber configuration by means of line according to the divergence of fixed groove can ensure that the fiber end face of emergent light into the specified area, such as scanning element. The following may be the application scenario of this mode according to FIGS. 16-19:

As shown in FIG. 16, an optical fiber end face, as an equivalent light source, may be incident to the reflecting surface of the scanner and forms field a.

As shown in FIG. 17, by adjusting the emission angle of the fiber, the second fiber end face, as the equivalent light source, will be incident to the reflecting surface of the scanner and form field b.

As shown in FIG. 18, by adjusting the emission angle of the fiber, the end face of the third fiber, as an equivalent light source, may be incident to the reflecting surface of the scanner and forms field c.

As shown in FIG. 19, the compound field of view formed after scanning of the output light of the three fibers may be the superposition of field a, field b and field c. In the three sub-field of view a, b and c, the radar resolution may be not affected as the scanning unit maintains a high scanning frequency.

FIGS. 16-19 may be just an illustration. By setting the number of optical fibers, such as increasing or decreasing the number of optical fibers as the equivalent light source, the resolution of lidar can be improved if the field of view remains unchanged. In addition, the introduction of multiple equivalent light sources may be equivalent to dividing the field of view to be detected into multiple parts. In this way, larger scanning frequency can be obtained by sacrificing scanning amplitude, so as to increase the maximum resolution of the same scanning unit. For example, for a single light source, scanning unit design of the scanning frequency may be 85 Hz, scanning mirror scanning angle may be divided into +/−5°; for multiple equivalent source, the system may reduce the scanning mirror into +/−3° scan angle, so that the scanning frequency of the scanning unit can be raised to 130 Hz.

In the aforesaid implementation example, aggregation may be a configuration mode of beam radiation direction based on fiber fixator and fiber end face. According to the setting of fiber direction and position by fiber fixation device and/or the optical effect formed by cutting mode of fiber end face, the beam emitted from fiber end face can be irradiated in the pre-determined directions. The overall representation may be not limited to the way of convergence, but can be parallel or divergent, or different outgoing optical fibers emit beams that intersect each other.

The specific configuration method can also include: the optical output end face of the fiber may be inclined end face, and the fiber fixed groove may be configured in parallel with each other.

In a possible embodiment, as shown in FIG. 2, the outgoing surface of the optical fiber can be treated in addition to using a clamp to fix the optical fiber as the equivalent light source. According to Maxwell's equation, when the optical output surface of a fiber may be a straight cross section, the wavefront of its optical field may be a cone, while for a one-dimensional fixture, in order to concentrate the light emitted by multiple optical fibers to the scanning surface or focusing lens, it can be realized by cutting the fiber end surface. For example, in FIG. 4 and FIG. 6, the optical fiber end face may be cut into different angles obliquely. By controlling the cutting angle, it can be satisfied:

$$C = \arcsin n_1/n_2$$

wherein n2 is air refractive index, n1 is the optical fiber refractive index. ⊖ represents the incident angle of the incident light beam to the angled end surface, 90-⊖ represents the optical fiber cutting angle. If the angle ⊖ is greater than the critical angle C, from fiber parallel incident detection may occur on the end face of cutting total reflection of light, so in the case of don't change the direction of the fiber itself (optical fiber may be parallel), change the direction of optical fiber emergent light. In FIG. 4 and FIG. 6, the light emitted by the optical fiber enters the lens surface at different angles. In some cases, the convergent lens can be omitted and the light emitted by the optical fiber end face at different angles may be incised onto the reflection mirror to achieve partial overlapping or perfect combination of the light field.

In the aforesaid implementation example, aggregation may be a configuration mode of beam radiation direction based on fiber fixator and fiber end face. According to the setting of fiber direction and position by fiber fixation device and the optical effect formed by cutting mode of fiber end face, the beam emitted from fiber end face can be irradiated in the pre-determined direction. The overall representation may be not limited to the way of convergence, but can be parallel or divergent, or different outgoing optical fibers emit beams that intersect each other.

In an example, as shown in FIG. 6, the optical fiber exit face may have a cone section, the angle of the cone crossing may be equal to the incident angle of the incident light beam to the angled end surface, and the incident light rays have a total reflection in the first section and are vertically incident in the second section. This ensures the maximum amount of light emitted.

The specific configuration method can also include: the optical output end face of the fiber may be inclined end face, meanwhile, the optical fiber fixed groove may be configured according to the radial direction of the divergence line.

According to the above configuration method, when the outgoing face of the optical fiber may be an inclined face, the incident angle of the optical fiber may be greater than critical angle, which can guarantee the total reflection on the tilted face, so as to ensure that as much light may be incident to the scanning mirror. Therefore, under certain conditions, in order to ensure that the outgoing end face angle of the fiber meets the full reflection angle, the outgoing end face of the fiber may be configured to be inclined end face angle and the configuration direction of the fiber fixed groove. Corresponding light fixtures are configured as arcs, triangles, and so on, so that angles are formed between the tilted light faces of each fiber. As shown in FIG. 9, optical fiber fixed for meniscus, with optical fiber fixed groove on the surface, the direction of the optical fiber fixed groove along the optical fiber fixed surface of divergent, one end of the fiber in optical fiber fixed groove through, and from the other end of the optical fiber fixed groove wear out, as a result, optical fiber are fixed in the optical fiber fixed with a first surface, and the emitting position may be fixed, the end face was cut for a inclined face. The light emitted from the optical fiber's end surface may be reflected to the target area, which can be a scanning reflector, an exit aperture, a convergent lens, an exit lens or an area to be scanned. In summary, the combination of the optical fiber end face setting and the configuration of the optical fiber fixed groove may enable the optical fiber outgoing beam to reach the designated area.

Without loss of generality, fiber fixator can also have other shapes, such as triangle, ring, semicircle, semicircle, ¼ circle ring and so on.

In a possible embodiment, the optical fiber outgoing end face may be cut diagonally, equivalent to the prism structure, which causes the outgoing light to deflect in the pre-determined direction. As shown in FIG. 5, the optical fiber outgoing end face may be tilted and cut into a prism structure with the angle 90-Φ, Φ represents the incident angle of the incident light beam to the angled end surface. When the angle Φ is smaller than critical angle, the fiber refracts at the inclined section and deflects towards the base of the prism. This causes the light beam from the optical fiber to be fired in the pre-determined direction.

In the aforementioned embodiments, it may be applicable to one-dimensional scans or two-dimensional scans with lower complexity. In some cases, the fiber can also provide light to the scanning unit in the form of an array of light sources. As shown in FIG. 14, the optical fibers are arranged in the space in the form of two-dimensional array and are incident at a certain angle to the reflective surface of the scanning device. After two-dimensional scanning of the scanning device, multiple two-dimensional sub-fields are formed through two-dimensional scanning. Fiber can be a two-dimensional equivalent light source array in the form of a two-dimensional array of 4×4. In fact, the two-dimensional array can also be a circular array as shown in FIG. 15, depending on the difference of scanning devices and the requirements of distributed optical scanning 170 on the working scene. Without loss of generality, the two-dimensional array can be, for example, 2×2, 3×2, 2×3, 3×3, and the like.

Connect the distributed optical fiber components of light output end set up into space in the form of a two-dimensional array, may be advantageous to the combination and overlay of the two-dimensional field of view. In some cases, two-dimensional array may need to be separately has a fixed array of optical fiber orientation and fixed point of view, this need to be careful to complete the installation and debugging, and in use process, the vibration of the external factors such as also easy to cause the change of the optical fiber position and/or facing, causing the originally set view change.

In a possible embodiment, as shown in FIG. 10-11, the fiber as the equivalent light source may be fixed in a one-dimensional array, and the orientation of the fiber body may be essentially parallel. The position of the optical fiber can be firmly controlled through the one-dimensional array fixture, and the outgoing direction of the optical fiber end surface can be controlled by the one-dimensional fixture. In this way, the fixture can firmly grip the optical fiber end surface even under the external force such as vibration to ensure the stability of the system. The first surface of the fiber optic fixator may be a serrated surface composed of multiple "V" groove structures. In possible embodiments, the size of the "V" groove may be accurately characterized and may be of a micron or submicron size.

In one possible embodiment, the fiber fixing service may be implemented without relying on the fiber fixing groove, and the fiber can be directly fixed on the fiber fixing fixture. The laser beam emitted by the laser light source may be coupled to the outgoing fiber; the optical fiber fixing device comprises a first surface, and the outgoing optical fiber may be fixed on the first surface, and the outgoing optical fiber has different orientations; the outgoing end face of the outgoing optical fiber and the orientation of the optical fiber are configured so that the light beam emitted from the end face of the optical fiber may be irradiated at a pre-determined angle.

Referring to FIG. 20 and FIG. 21, the lidar may also include at least one heat sink plate 4 and at least one laser emitter plate 3, The laser may be arranged on the laser emission plate 3, and the heat sink plate 4 may be connected with the rotor structure 2, and the laser emission plate 3 may be arranged on one side of the heat sink plate 4. The laser emission plate 3 may be connected with the heat sink plate 4 to absorb the heat generated by the laser.

The heat sink plate 4 extends in whole or in part from the center end of the rotor structure 2 to form a heat fin 41.

As shown in FIG. 21, the lidar consists of multiple laser emission plates 3 and multiple heat sink plates 4, one of which may be connected with at least one heat sink plate 4, and the heat sink plate 4 may be extended away from the center of the rotor structure 2 to form heat fin 41.

As shown in FIG. 23, the rotor structure 2 has the top surface, the bottom surface, the inner side and the outer side that are opposite to the top surface. The inner surface may be provided with at least one heat dissipator 6, and the heat dissipator 6 sets are fixed on the inner side of the rotor structure 2.

As shown in FIG. 23, the heat dissipation element 6 includes fixed ring plate 61 and heat dissipation blade 62. The heat dissipation blade 62 may be arranged on the inner wall of the fixed ring plate 61.

As shown in FIG. 24, the center of rotor structure 2 may be provided with a through hole, which runs through the bottom surface and the top surface. The underside may be provided with a plurality of support blocks 21 along the circumferential interval of the through-hole to ensure that the air duct may be not hindered.

Referring to FIGS. 20-24, a multiline lidar may be consisted of a rotor, a laser transmitter, and an outgoing lens, the rotor may have a transmission chamber and a receiving chamber isolated from each other. The laser emitting device may be used for transmitting probe light to the target object. The outgoing lens group may be used to transmit the probe light received to the probe area. Laser emission device including at least one laser sheet 3 and fiber coupling, described the laser emission plate launch cavity of 3 set, as described in 3 laser plate installed at least one to launch the detecting light source, as described in the coupling fiber optic light source, one to one correspondence with stated, described in the light source and referred to the input end of the fiber coupling connection, described the output end of the set in the coupling fiber referred to exit the focal plane of the lens component. The exit lens group may be used for collimating and transmitting the probe light to the focal plane through the coupling optical fiber and to the probe region.

The laser transmitting device may also comprise an optical coupler and the light source may be coupled with the input end of the coupling fiber through the optical coupler. The coupling fiber may be provided with a light modulation module.

The lidar may also include a receiving lens assembly for focusing the laser reflected from the target object, and the receiving lens assembly may be arranged in the receiving cavity. The lidar also includes a laser receiving device for receiving the laser reflected from the target object. The laser receiving device may comprise a laser conduction unit, a photoelectric detector array and a receiving circuit board.

The laser conduction unit may be used to conduct the laser after the receiving lens group may be focused, and the photoelectric detector array may be arranged on the receiving circuit board to receive the laser transmitted by the laser conduction unit.

The laser emission device also includes a laser emission control module, which may be connected with the laser emission plate 3 to control the driving circuit on the laser emission plate 3 to drive the corresponding light source to emit light.

As shown in FIG. 20 and FIG. 21, the laser emitting device may also include multiple heat sinks plate 4, the heat sinks plate 4 may be connected with the rotor, the laser emission plate 3 may be arranged on one side of the heat sinks plate 4, and the laser emission plate 3 may be connected with the heat sinks plate 4 to absorb the heat generated by the light source.

The heat sink plate 4 extends away from the center end of the rotor to form a heat fin 41.

The rotor center may be provided with a through hole, which may be used to place the signal transmission structure and the power transmission structure.

The material of the heat sink plate 4 may be any combination of copper, molybdenum and aluminum. The laser emission plate 3 may be fixed on the heat sink plate 4 by mechanical or welding methods.

The lidar may also comprise a base, a housing and a motor, and the base and the housing are connected together to form a closed cavity. Both the motor and the rotor are arranged in the cavity body, and the motor may be arranged on the base. The rotor may be connected with the motor, and the motor can drive the rotor to rotate.

As shown in FIG. 23, the rotor may have a top surface, a bottom surface opposite the top surface, an inner side and an outer side. The inner surface may be provided with at least one heat element 6.

As shown in FIG. 22, the heat dissipation element 6 may include a fixed ring plate 61 and heat dissipation blade 62. The heat dissipation blade 62 may be arranged on the inner wall of the fixed ring plate 61, and may be designed to be in the degree of angle of 10° to 80°.

The fixed annular plate 61 may be an annular structure, and the outer diameter of the fixed annular plate 61 may be the same as the inner diameter of the rotor. The height of the radiator blade 62 may be, for example, 2 mm-8 mm. The spacing between the two adjacent radiator blades 62 may be, for example, 2 mm-50 mm. The heat dissipating blade 62 may be made of plastic, metal or alloy material. The heat dissipating blade 62 may be any of the flat blade, curved blade, streamline blade or volute blade. The heat dissipating element 6 may be an integral molding structure.

As shown in FIG. 23, the through-hole runs through the underside and the top side, and the side wall of the through-hole forms the inner side. The underside may be provided with a plurality of support blocks 21 along the circumferential interval of the through-hole to ensure that the air duct may be not hindered. The shape of the support block 21 may be any one or several combinations of fan-shaped, rectangular, trapezoidal or heteromorphic structures.

What is claimed is:

1. A laser range and detection system comprising:
    a plurality of light sources optically coupled with a plurality of optical fiber elements;
    a mounting unit, wherein the mounting unit is coupled to an emitting end of the plurality of optical fiber elements via a directional structure thereby providing a configurable distribution pattern of light beams emitted from the emitting end of the plurality of optical fiber elements, wherein the directional structure directs the emitting end of the plurality of optical fiber elements at various angles within a first plane; and
    a scanner that causes the light beams emitted from the emitting end of the plurality of optical fiber elements to scan across a second plane that is not aligned with the first plane.

2. The laser range and detection system of claim 1, wherein the plurality of light sources, the plurality of optical fiber elements, or the mounting unit rotates about a vertical axis.

3. The laser range and detection system of claim 1, wherein the plurality of light sources, the plurality of optical fiber elements or the mounting unit is disposed on a supporting body connected to a rotor of the laser range and detection system.

4. The laser range and detection system of claim 1, wherein the distribution pattern of the light beams emitted from the emitting end of the plurality of optical fiber elements is independent of an arrangement of the plurality of light sources.

5. The laser range and detection system of claim 1, wherein at least one of the plurality of light sources is optically coupled to at least one of the plurality of optical fiber elements using an optical coupling element.

6. The laser range and detection system of claim 1, wherein at least one of the plurality of light sources is optically coupled to two or more of the plurality of optical fiber elements using an optical coupling element.

7. The laser range and detection system of claim 6, wherein the two or more of the plurality of optical fiber elements have different optical properties.

8. The laser range and detection system of claim 1, wherein the mounting unit is mechanically connected to a rotor of the laser range and detection system with a pre-determined orientation.

9. The laser range and detection system of claim 1, wherein the directional structure is integrally formed with the mounting unit.

10. The laser range and detection system of claim 1, wherein the directional structure comprises a set of optical waveguides.

11. The laser range and detection system of claim 10, wherein the set of optical waveguides are non-uniformly distributed along the length direction of the mounting unit.

12. The laser range and detection system of claim 1, wherein the directional structure comprises a set of slots that are located on one side of the mounting unit.

13. The laser range and detection system of claim 12, wherein each of the set of slots has a pre-determined tilt angle within the first plane and wherein the first plane is a vertical plane.

14. The laser range and detection system of claim 13, wherein an output direction of the light beams is individually controlled by selecting a given slot with a pre-determined tilt angle from the set of slots.

15. The laser range and detection system of claim 12, wherein the distribution pattern of the light beams emitted from the emitting end of the plurality of optical fiber elements is controlled by selecting a subset of slots from the set of slots.

16. The laser range and detection system of claim 1, wherein the light beams emitted from the emitting end of the plurality of optical fiber elements are directed to an optical element to collimate the plurality of light beams into collimated light beams to propagate in different directions.

17. A laser range and detection system comprising:
a plurality of optical fiber elements;
a mounting unit, wherein the mounting unit is coupled to an emitting end of the plurality of optical fiber elements via a directional structure thereby providing a configurable distribution pattern of light beams emitted from the emitting end of the plurality of optical fiber elements wherein the directional structure directs the emitting end of the plurality of optical fiber elements at various angles within a first plane; and
a scanning unit configured to steer the light beams along one or more directions to scan across one or more planes, wherein at least one of the one or more planes is not aligned with the first plane.

18. The laser range and detection system of claim 17, wherein a subset of the plurality of optical fiber elements are optically coupled to one or more light sources by an input end.

19. The laser range and detection system of claim 17, wherein the scanning unit comprises one or more mirrors.

20. The laser range and detection system of claim 17, wherein the directional structure comprises a set of slots that are located on one side of the mounting unit.

* * * * *